(12) United States Patent
Ke

(10) Patent No.: US 12,349,235 B2
(45) Date of Patent: *Jul. 1, 2025

(54) METHOD FOR SUPPORTING TIME-SENSITIVE COMMUNICATION AND COMMUNICATIONS DEVICE

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,978

(22) Filed: Dec. 6, 2023

(65) Prior Publication Data

US 2024/0114333 A1 Apr. 4, 2024

Related U.S. Application Data

(63) Continuation of application No. 17/392,324, filed on Aug. 3, 2021, now Pat. No. 11,889,587, which is a
(Continued)

(30) Foreign Application Priority Data

Feb. 3, 2019 (CN) .......................... 201910108730.6

(51) Int. Cl.
*H04W 76/12* (2018.01)
*H04B 17/364* (2015.01)
*H04W 8/22* (2009.01)

(52) U.S. Cl.
CPC ............ *H04W 8/22* (2013.01); *H04B 17/364* (2015.01); *H04W 76/12* (2018.02)

(58) Field of Classification Search
CPC ....... H04W 8/22; H04W 76/12; H04W 76/11; H04W 28/0215; H04W 28/0236;
(Continued)

(56) References Cited

U.S. PATENT DOCUMENTS

| 2013/0138800 A1* | 5/2013 | Gelter | ................... H04L 65/80 |
| | | | 709/224 |
| 2018/0006955 A1* | 1/2018 | Bush | ................... H04L 47/22 |
| 2021/0368331 A1* | 11/2021 | Ke | ................... H04B 17/364 |

FOREIGN PATENT DOCUMENTS

CN 103517347 A 1/2014

OTHER PUBLICATIONS

Vivo ("Discussion on how to support TSN QoS requirement", 3GPP Draft; S2-1900144, 3rd Generation Partnership Project (3GPP), Mobile Competence Centre ; 650, Route Des Lucioles; F-06921 Sophia-Antipolis Cedex; France, vol. SA WG2, No. Kochi, India; Jan. 21, 2019-Jan. 25, 2019, Jan. 15, 2019), Jan. 2019.*

(Continued)

*Primary Examiner* — Lakeram Jangbahadur
(74) *Attorney, Agent, or Firm* — Price Heneveld LLP

(57) ABSTRACT

A method for supporting time-sensitive communication and a communications device are provided. A method for supporting time-sensitive communication applied to a first communications device includes: transmitting first capability information and/or delay related information of a terminal UE, where the first capability information includes at least one of the following: information related to a delay between the UE and a first adapter, bridge identification information of the first adapter, information about a bandwidth supported by the first adapter, transmission propagation delay related information of the first adapter, bridge identification information of the UE and the first adapter as a whole, information about a bandwidth supported by the
(Continued)

UE and the first adapter as a whole, or transmission propagation delay related information of the UE and the first adapter as a whole.

16 Claims, 10 Drawing Sheets

Related U.S. Application Data continuation of application No. PCT/CN2020/074211, filed on Feb. 3, 2020.

(58) Field of Classification Search
CPC .... H04W 88/14; H04B 17/364; H04L 12/462; H04L 12/4641
See application file for complete search history.

(56) References Cited

OTHER PUBLICATIONS

3GPP (3rd Generation Partnership Project; Technical Specification Group Services and System Aspects; Study on enhancement of 5GS for Vertical and LAN Services (Release 16); 3GPP Standard; Technical Report; 3GPP TR 23.734, Dec. 19, 2018, Dec. 19, 2018), Dec. 2018.*

Huawei (Discussion on system enhancement for TSN logical bridge management—S2-1900590), Jan. 2019.*

Nokia, "TSN—QoS", SA WG2 Meeting #130, S2-1900559, Jan. 21-25, 2019, Kochi, India.

Nokia, "Time Sensitive Networking", 3GPP TSG-RAN WG3 Meeting #101bis, R3-185958, Chengdu, China, Oct. 8-12, 2018.

3rd Generation Partnership Project; Technical Specification Group Services and System Aspects; Study on enhancement of 5GS for Vertical and LAN Services (Release 16); 3GPP TR 23.734 v16.0.0 (Dec. 2018) (107 pages).

Huawei, "QoS Negotiation between 3GPP and TSN networks KI#3.1," SA WG2 Meeting #129, S2-1811021, Oct. 15-19, 2018, Dongguan, China (9 pages).

Nokia, "TSN—QoS Framework," SA WG2 Meeting #129, S2-1811338, Oct. 15-19, 2018, Dongguan, China (8 pages).

Vivo, "Discussion on how to support TSN QoS requirement," SA WG2 Meeting #130, S2-1900144, Jan. 21-25, 2019, Kochi, India (5 pages).

Huawei, "Discussion on system enhancement for TSN logical bridge management," 3GPP TSG-SA WG2 Meeting #130, S2-1900590, Jan. 21-25, 2019, Kochi, India (4 pages).

Huawei, "System enhancement for TSN logical bridge management," Change Request 3GPP TSG-SA WG2 Meeting #130, S2-1900592, Jan. 21-25, 2019, Kochi, India (12 pages).

* cited by examiner

Transmit first capability information, where
the first capability information includes at least one of the following:
information about a delay between UE and a first adapter, bridge identification
information of the first adapter, information about a bandwidth supported by
the first adapter, transmission propagation delay related information of the
first adapter, bridge identification information of the UE and the first adapter
as a whole, information about a bandwidth supported by the UE and the first
adapter as a whole, and transmission propagation delay related information of
the UE and the first adapter as a whole
— 41

FIG. 4

Obtain first information, where the first information includes at least one of
the following: first capability information, second capability information,
delay related information of UE, and/or delay related information of an
anchor gateway
— 51

Perform a first operation based on the first information
— 52

FIG. 5

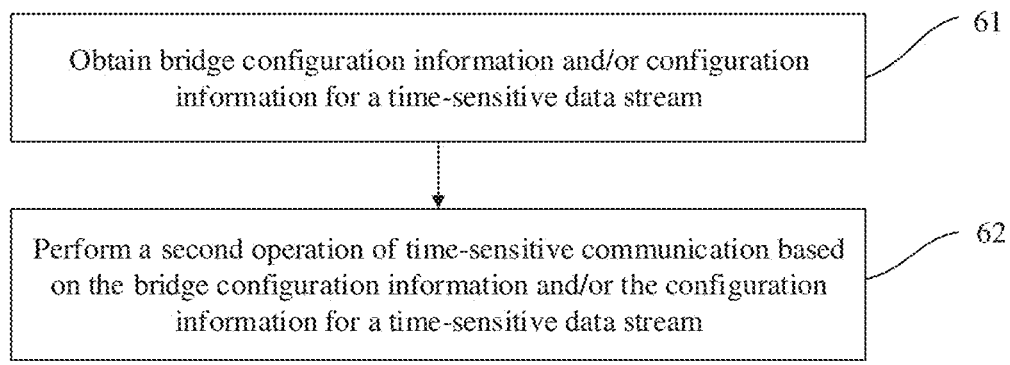

FIG. 6

Transmit second capability information, where the second capability information includes at least one of the following: information related to a delay between an anchor gateway and a second adapter, bridge identification information of the second adapter, information about a bandwidth supported by the second adapter, transmission propagation delay related information of the second adapter, bridge identification information of the anchor gateway and the second adapter as a whole, information about a bandwidth supported by the anchor gateway and the second adapter as a whole, and transmission propagation delay related information of the anchor gateway and the second adapter as a whole

METHOD FOR SUPPORTING TIME-SENSITIVE COMMUNICATION AND COMMUNICATIONS DEVICE

CROSS-REFERENCE TO RELATED APPLICATIONS

This application claims the benefit of and is a continuation application of U.S. patent application Ser. No. 17/392,324 filed on Aug. 3, 2021 which is a continuation application of PCT Application No. PCT/CN2020/074211 filed on Feb. 3, 2020, which claims priority to Chinese Patent Application No. 201910108730.6, filed in China on Feb. 3, 2019, the disclosures of which are incorporated herein by reference in their entireties.

TECHNICAL FIELD

Embodiments of this disclosure relate to the field of wireless communication technologies, and in particular, to a method for supporting time-sensitive communication and a communications device.

BACKGROUND

Many vertical industries have demands for time-sensitive communication. In the industrial internet, there are time-sensitive data, such as robot instructions, which need to be executed sequentially within a specified time. However, since network transmission resources are shared, and delays and jitters exist during data transmission, transmission of time-sensitive data cannot be supported. Therefore, time-sensitive networking is proposed to support the transmission of time-sensitive data.

In time-sensitive networking, time is divided into intervals (Interval), which are sliding windows. A traffic specification (traffic specification) for time-sensitive data streams is defined in each sliding window, to reserve transmission resources in advance. In this way, when the sliding window for data transmission arrives, even if there is no time-sensitive data stream, network resources cannot be occupied by other data streams. When a time-sensitive data stream arrives, dedicated resources are occupied for its transmission.

A transmitting end of a time-sensitive data stream is referred to as talker, and a receiving end of the time-sensitive data stream is referred to as listener. Data is forwarded through one or more bridges between the talker and the listener.

Transmission media for the talker, the listener, and the bridge may all be wireless connection. Therefore, a wireless communications network may be a transmission medium for time-sensitive networking. How time-sensitive communication is supported on a wireless communications network is a technical problem to be urgently resolved in the related art.

SUMMARY

Embodiments of this disclosure provide a method for supporting time-sensitive communication and a communications device.

In order to resolve the foregoing technical problem, this disclosure is implemented as follows:

According to a first aspect, an embodiment of this disclosure provides a method for supporting time-sensitive communication, applied to a first communications device and including:

transmitting first capability information and/or delay related information of UE, where the first capability information includes at least one of the following:

information related to a delay between the UE and a first adapter, bridge identification information of the first adapter, information about a bandwidth supported by the first adapter, transmission propagation delay related information of the first adapter, bridge identification information of the UE and the first adapter as a whole, information about a bandwidth supported by the UE and the first adapter as a whole, or transmission propagation delay related information of the UE and the first adapter as a whole.

According to a second aspect, an embodiment of this disclosure provides a method for supporting time-sensitive communication, applied to a second communications device and including:

obtaining first information, where the first information includes at least one of the following: first capability information, second capability information, delay related information of UE, and/or delay related information of an anchor gateway; and performing a first operation based on the first information; where the first capability information includes at least one of the following: bridge identification information of a first adapter, information about a bandwidth supported by the first adapter, transmission propagation delay related information of the first adapter, bridge identification information of the UE and the first adapter as a whole, information about a bandwidth supported by the UE and the first adapter as a whole, and transmission propagation delay related information of the UE and the first adapter as a whole; and the second capability information includes at least one of the following: bridge identification information of a second adapter, information about a bandwidth supported by the second adapter, transmission propagation delay related information of the second adapter, bridge identification information of the anchor gateway and the second adapter as a whole, information about a bandwidth supported by the anchor gateway and the second adapter as a whole, or transmission propagation delay related information of the anchor gateway and the second adapter as a whole.

According to a third aspect, an embodiment of this disclosure provides a method for supporting time-sensitive communication, applied to a time-sensitive network adapter and including:

obtaining bridge configuration information and/or configuration information for a time-sensitive data stream; and performing a second operation of time-sensitive communication based on the bridge configuration information and/or the configuration information for a time-sensitive data stream.

According to a fourth aspect, an embodiment of this disclosure provides a method for supporting time-sensitive communication, applied to a third communications device and including:

transmitting second capability information and/or delay related information of an anchor gateway; where the second capability information includes at least one of the following:

information related to a delay between an anchor gateway and a second adapter;

bridge identification information of the second adapter;
information about a bandwidth supported by the second adapter;
transmission propagation delay related information of the second adapter;
bridge identification information of the anchor gateway and the second adapter as a whole;
information about a bandwidth supported by the anchor gateway and the second adapter as a whole; or
transmission propagation delay related information of the anchor gateway and the second adapter as a whole.

According to a fifth aspect, an embodiment of this disclosure provides a communications device, and the communications device is a first communications device, including:
a transmitting module, configured to transmit first capability information and/or delay related information of UE, where
the first capability information includes at least one of the following:
information related to a delay between the UE and a first adapter, bridge identification information of the first adapter, information about a bandwidth supported by the first adapter, transmission propagation delay related information of the first adapter, bridge identification information of the UE and the first adapter as a whole, information about a bandwidth supported by the UE and the first adapter as a whole, or transmission propagation delay related information of the UE and the first adapter as a whole.

According to a sixth aspect, an embodiment of this disclosure provides a communications device, and the communications device is a second communications device, including:
an obtaining module, configured to obtain first information, where the first information includes at least one of the following: first capability information, second capability information, delay related information of UE, and/or delay related information of an anchor gateway; and
an execution module, configured to perform a first operation based on the first information; where
the first capability information includes at least one of the following: bridge identification information of a first adapter, information about a bandwidth supported by the first adapter, transmission propagation delay related information of the first adapter, bridge identification information of the UE and the first adapter as a whole, information about a bandwidth supported by the UE and the first adapter as a whole, and transmission propagation delay related information of the UE and the first adapter as a whole; and
the second capability information includes at least one of the following: bridge identification information of a second adapter, information about a bandwidth supported by the second adapter, transmission propagation delay related information of the second adapter, bridge identification information of the anchor gateway and the second adapter as a whole, information about a bandwidth supported by the anchor gateway and the second adapter as a whole, or transmission propagation delay related information of the anchor gateway and the second adapter as a whole.

According to a seventh aspect, an embodiment of this disclosure provides a communications device, and the communications device is a time-sensitive network adapter, including:
an obtaining module, configured to obtain bridge configuration information and/or configuration information for a time-sensitive data stream; and
an execution module, configured to perform a second operation of time-sensitive communication based on the bridge configuration information and/or the configuration information for a time-sensitive data stream.

According to an eighth aspect, an embodiment of this disclosure provides a communications device, and the communications device is a third communication device, including:
a transmitting module, configured to transmit second capability information and/or delay related information of an anchor gateway, where
the second capability information includes at least one of the following:
information related to a delay between an anchor gateway and a second adapter;
bridge identification information of the second adapter;
information about a bandwidth supported by the second adapter;
transmission propagation delay related information of the second adapter;
bridge identification information of the anchor gateway and the second adapter as a whole;
information about a bandwidth supported by the anchor gateway and the second adapter as a whole; or
transmission propagation delay related information of the anchor gateway and the second adapter as a whole.

According to a ninth aspect, an embodiment of this disclosure provides a communications device, including a processor, a memory, and a computer program stored in the memory and capable of running on the processor, where when the computer program is executed by the processor, the steps of the method for supporting time-sensitive communication according to the first aspect are implemented, or the steps of the method for supporting time-sensitive communication according to the second aspect are implemented, or the steps of the method for supporting time-sensitive communication according to the third aspect are implemented, or the steps of the method for supporting time-sensitive communication according to the fourth aspect are implemented.

According to a tenth aspect, an embodiment of this disclosure provides a computer-readable storage medium, where a computer program is stored in the computer-readable storage medium, and when the computer program is executed by a processor, the steps of the method for supporting time-sensitive communication according to the first aspect are implemented, or the steps of the method for supporting time-sensitive communication according to the second aspect are implemented, or the steps of the method for supporting time-sensitive communication according to the third aspect are implemented, or the steps of the method for supporting time-sensitive communication according to the fourth aspect are implemented.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. Throughout the accompanying drawings, the same reference numerals represent the same components. In the accompanying drawings:

FIG. 4 is a flowchart of a method for supporting time-sensitive communication according to an embodiment of this disclosure;

FIG. 5 is a flowchart of another method for supporting time-sensitive communication according to an embodiment of this disclosure;

FIG. 6 is a flowchart of another method for supporting time-sensitive communication according to an embodiment of this disclosure;

FIG. 7 is a flowchart of another method for supporting time-sensitive communication according to an embodiment of this disclosure;

DESCRIPTION OF EMBODIMENTS

Figure 1:
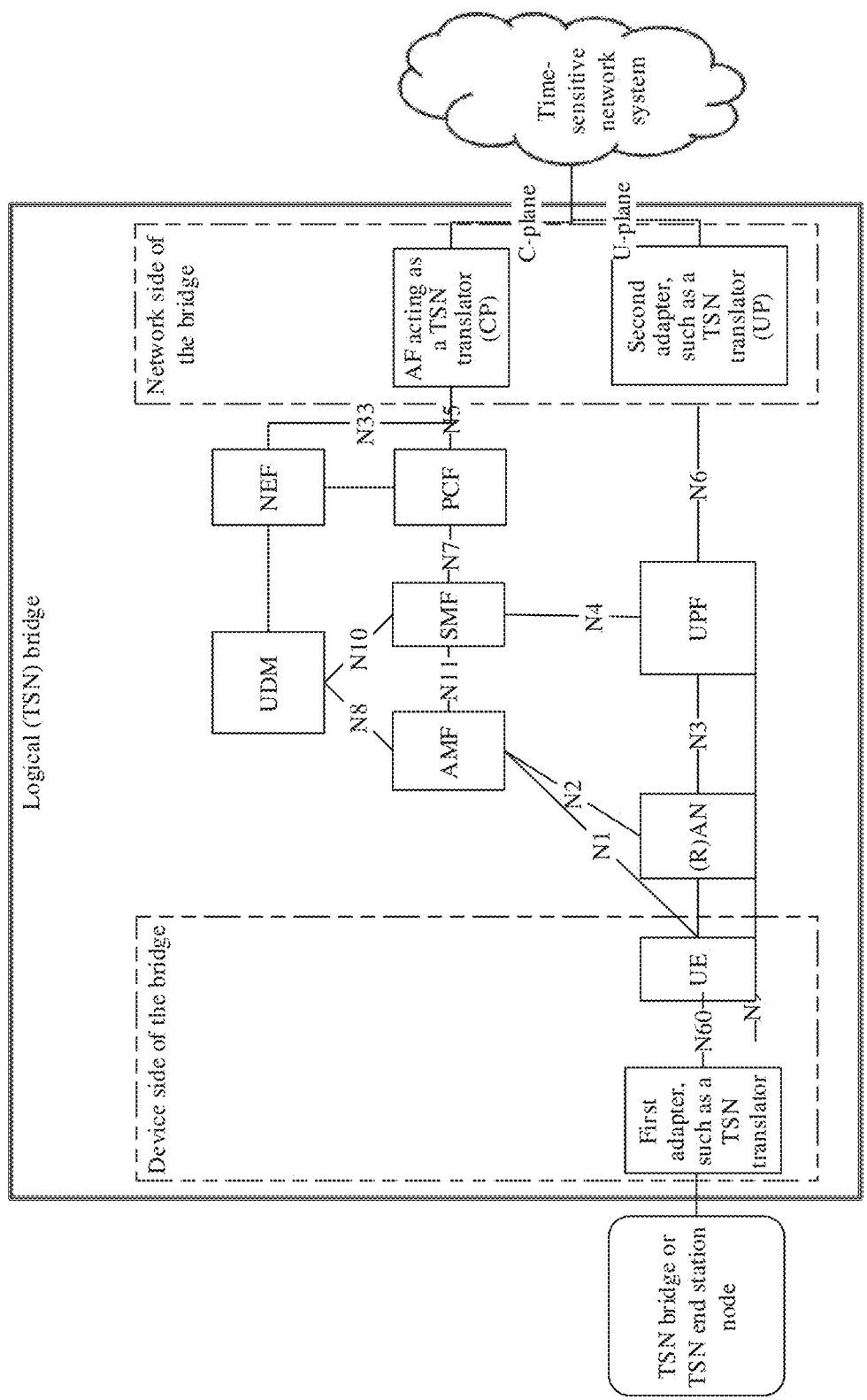
FIG. 1 is a schematic architectural diagram of a wireless communications system according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of this disclosure, terms such as "an example" or "for example" are used to represent examples, illustrations, or explanations. Any embodiment or design solution described as "an example" or "for example" in the embodiments of this disclosure shall not be interpreted to be more optional or advantageous than other embodiments or design solutions. To be precise, the words such as "an example" or "for example" are intended to present a related concept in a specific manner.

The following describes the embodiments of this disclosure with reference to the accompanying drawings. A method for supporting time-sensitive communication and a communications device provided in the embodiments of this disclosure may be applied to a wireless communications system. The wireless communications system may be a fifth generation (5G) system, or an evolved long term evolution (eLTE) system, or a subsequent evolved communications system.

In the embodiments of this disclosure, time-sensitive (Time Sensitive) may be also referred to as periodic deterministic (Periodic deterministic). Time-sensitive communication may be also referred to as periodic deterministic communication (Periodic deterministic communication). A time-sensitive data stream may be also referred to as a periodic deterministic data stream. An example of the time-sensitive network technology is Institute of Electrical and Electronic Engineers (IEEE) TSN (Time Sensitive Network). In periodic deterministic communication, data is transmitted periodically at transmission intervals.

In the embodiments of this disclosure, transmission configuration information of the time-sensitive data stream may include user and/or network configuration information. The user and/or network configuration information (User/Network Configuration Information) is used to configure transmission of the time-sensitive data stream. The user and/or network configuration information may be user and/or network configuration information specified in IEEE 802.1Qcc. The user and/or network configuration information may include at least one of the following: a listener group (listener group), a talker group (talker group), and a traffic specification (traffic specification).

Referring to FIG. 1, FIG. 1 is a schematic architectural diagram of a wireless communications system according to an embodiment of this disclosure.

A transmitting end of a time-sensitive data stream is referred to as talker, and a receiving end of the time-sensitive data stream is referred to as listener. Data is forwarded through one or more bridges between the talker and the listener. An end station (End Station) may be a talker or a listener. The bridge (Bridge) is responsible for data transmission between the talker and the listener.

UE, a time-sensitive adapter, and a wireless communications network form a bridge. For downlink data, a first adapter and the UE are an egress of the bridge (Bridge), and a UPF and a second adapter are an ingress of the bridge. For uplink data, the first adapter and the UE are an ingress of the bridge, and the user plane function (UPF) and the second adapter are an egress of the bridge.

The first adapter is an adapter in a time-sensitive network, and is configured to terminate a port of a UE side of a 5G bridge or configured to connect a bridge or an end station. The second adapter is an adapter in the time-sensitive network, and is configured to terminate a port of a network side of the 5G bridge or configured to connect a bridge or an end station.

The first adapter and/or the second adapter may be a time-sensitive network adapter. The time-sensitive network adapter may also be referred to as a time-sensitive network translator (TSN TRANSLATOR).

The UE may be co-located with the first adapter. In this case, it can be considered that the UE is connected to a bridge or an end station. The anchor gateway may be co-located with the second adapter. In this case, it can be considered that the anchor gateway is connected to a bridge or an end station.

The UE may be co-located with an end station; or the UE may be co-located with a bridge; or the UE may be connected to a bridge or the UE may be connected to an end station.

The UE may be connected to the first adapter. The UPF may be connected to the second adapter.

The user and/or network configuration information (User/Network Configuration Information) is used to configure transmission of the time-sensitive data stream. For a centralized architecture, the wireless communications network may obtain the user and/or network configuration information through an external control unit that provides configuration information and an application function (AF). The external control unit that provides configuration information may be a centralized network configuration (CNC), which is not limited.

For a distributed architecture, the wireless communications network may receive user and/or network configuration information of a previous hop from the ingress of the bridge, and then generate user and/or network configuration information of the local bridge.

Figure 2:
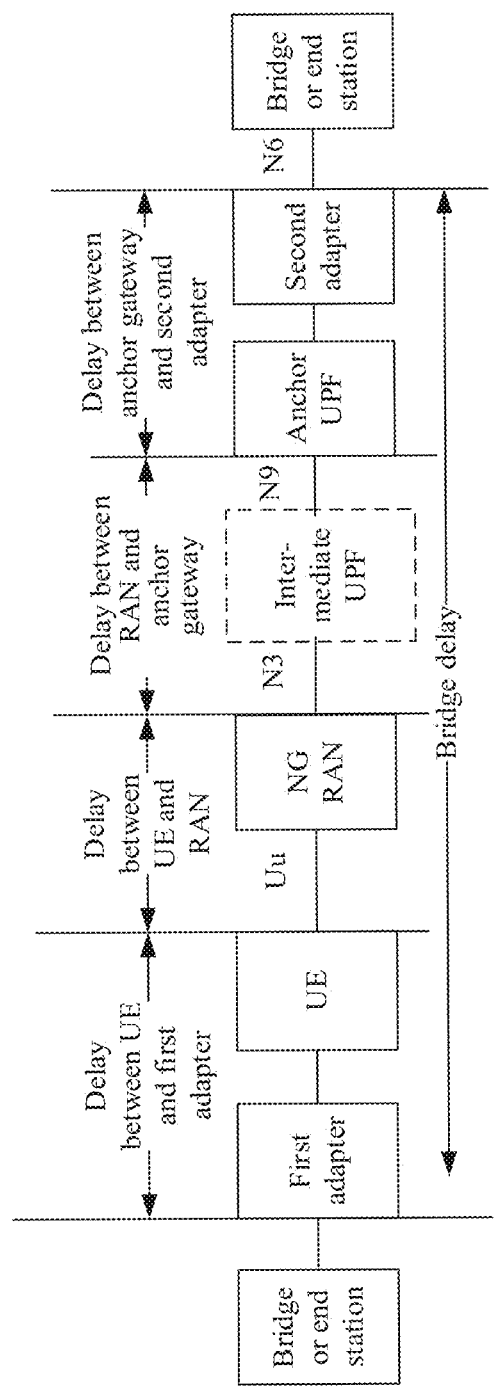
FIG. 2 is a schematic architectural diagram of another wireless communications system according to an embodiment of this disclosure.

Referring to FIG. 2, FIG. 2 is a schematic architectural diagram of another wireless communications system according to an embodiment of this disclosure.

As shown in FIG. 2, UE, a radio access network (RAN) network element, and a gateway UPF are included, where the UPF may be one or more UPFs. There may be no or a plurality of intermediate (Intermediate) UPFs between the RAN and an anchor UPF.

Figure 3:
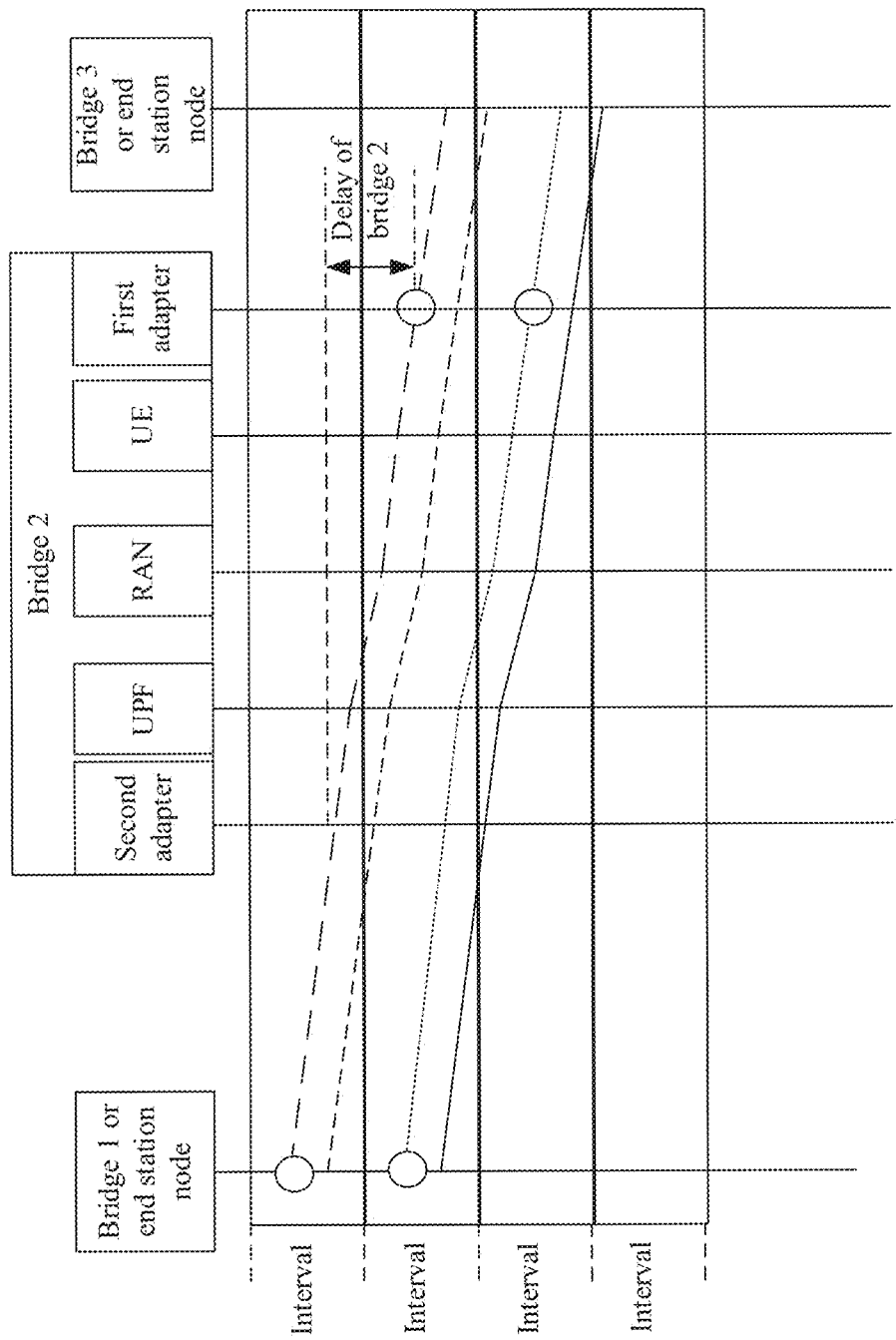
FIG. 3 is a schematic diagram of transmitting a time-sensitive data stream in a bridge.

Referring to FIG. 3, FIG. 3 is a schematic diagram of transmitting a time-sensitive data stream in a bridge. In time-sensitive networking, time is divided into intervals (Interval) as sliding windows, and that between the two circles may represent a delay of a bridge 2 (Bridge delay). In an embodiment of this disclosure, a bridge formed by a terminal, a first adapter, a second adapter, and a wireless communications network may be simply referred to as a bridge formed by the terminal, a time-sensitive adapter, and the network.

In an embodiment of this disclosure, the transmission interval may be referred to as a transmission period.

In order to support time-sensitive communication services, the following problems need to be further resolved:

Problem 1: During determining of user and/or network configuration information, a bridge delay needs to be considered for a CNC. As shown in FIG. 2, the bridge delay includes a delay between the UE and the first adapter, a delay between the UE and a RAN network element, a delay between a RAN and a UPF, and a delay between anchor gateway and second adapter.

(1) The delay between the UE and the first adapter is related to the UE. Different UEs may have different capabilities. First adapters connected to different UEs may also be different, and one UE or first adapter may support a plurality of ports. The delay between the UE and the first adapter may also be referred to as a bridge delay of a bridge formed by the UE and the first adapter, or may be a time of data transmission between one port and a Uu interface. Therefore, the delay between the UE and the first adapter may also be different for different ports. Time-sensitive networking requires nanosecond-level delays, and the delay between the UE and the first adapter cannot be ignored. Therefore, how to learn the delay between the UE and the first adapter by the network to determine the bridge delay of the bridge formed by the UE, the time-sensitive network adapter, and/or the wireless communications network is a problem that needs to be resolved.

(2) The delay between the anchor gateway and the second adapter is a part of an internal delay of the bridge. Different anchor gateways have different capabilities. Second adapters connected to different anchor gateways may also be different, and one anchor gateway or second adapter may support a plurality of ports. The delay between the anchor gateway and the second adapter may also be referred to as a bridge delay of a bridge formed by the anchor gateway and the second adapter. Therefore, how to learn the delay between the anchor gateway and the second adapter by the network to determine the bridge delay of the bridge formed by the UE, the time-sensitive network adapter, and/or the wireless communications network is a problem that needs to be resolved.

Problem 2: When the UE or the first adapter is used as the egress of the bridge, a transmission medium connected to the UE or the first adapter has different capabilities due to different capabilities of UEs or first adapters. Therefore, an available bandwidth (or referred to as a transmission rate) supported by the first adapter is different. That is, a propagation delay of the UE and/or the first adapter as a whole is different.

Data packets of the same size require different transmission times in different bandwidths. For time-sensitive networking, a time period between a latest transmission start time and a data transmission end time needs to be long enough to transmit the last data packet within a transmission interval. The data transmission intervals have the same end time, and therefore the latest transmission start time is different for different bandwidths.

In the related art, for the centralized bridge architecture, the CNC needs to obtain a capability (such as an available bandwidth) of the bridge to configure the user and/or network configuration information. For the distributed bridge architecture, the bridge formed by the UE and the network obtains user and/or network configuration information of the previous hop after receiving an SRP message, and also needs to configure user and/or network configuration information of the next hop based on a capability of the bridge. However, the wireless communications network still lacks information about the capability of the UE and/or the first adapter as a whole acting as the egress. Likewise, the wireless communications network also lacks information about the capability of the anchor gateway or the second adapter as a whole acting as the egress.

Optionally, obtaining may be understood as acquiring from configuration, receiving, obtaining through receiving upon a request, obtaining through self-learning, obtaining through deduction based on non-received information, or obtaining through processing received information, which may be determined according to actual needs. This is not limited in the embodiments of this disclosure. For example, when no specific capability indication information transmitted by a device is received, it can be deduced that the device does not support the capability.

Optionally, transmitting may include broadcasting, broadcasting through a system message, or returning a response after receiving the request.

In an optional embodiment of this disclosure, the tunnel may include at least one of the following: a protocol data unit (PDU) session, a quality of service (QoS) flow, an evolved packet system (EPS) bearer, a packet data protocol (PDP) context, a data radio bearer (DRB), a signaling radio bearer (SRB), and internet protocol security (IPsec) association.

In an optional embodiment of this disclosure, the port may be a bridge port.

In an optional embodiment of this disclosure, the bandwidth may be an available bandwidth.

In an embodiment of this disclosure, an NG interface may be also referred to as an S1 interface or an N2 interface, and the naming is not limited.

In an optional embodiment of this disclosure, the N3N9 interface is an N3 or N9 interface.

In an optional embodiment of this disclosure, the wireless communications network may be referred to as a network for short.

In an embodiment of this disclosure, the wireless communications network may be at least one of the following: a public network and a non-public network. For example, a first network may be a non-public network.

In an embodiment of this disclosure, a non-public network may be referred to as one of the following: a non-public communications network. The non-public network may include at least one of the following deployment manners: physical non-public network, virtual non-public network, and non-public network implemented on a public network. In an implementation, the non-public network is a closed access group (CAG). A CAG may include a group of terminals.

In an embodiment of this disclosure, the non-public network may include or be referred to as a private network. The private network may be referred to as one of the following: a private communications network, a private network, a local area network (LAN), a private virtual network (PVN), an isolated communications network, a dedicated communications network, or other names. It should be noted that the naming manner is not specifically limited in the embodiments of this disclosure.

In an embodiment of this disclosure, the public network is an abbreviation of the public network. The public network may be referred to as one of the following: a public communications network or other names. It should be noted that the naming manner is not specifically limited in the embodiments of this disclosure.

In an embodiment of this disclosure, a data packet size may be referred to as a data packet length.

In an embodiment of this disclosure, a data packet may be referred to as a data frame.

In an embodiment of this disclosure, configuration information of the time-sensitive data stream may be user and/or network configuration information. The user and/or network configuration information may be user and/or network configuration information specified in the IEEE 802.1Q standard. The user and/or network configuration information may include at least one of the following: a listener group (group), a talker group (group), and a traffic specification (traffic specification). In an optional embodiment of this disclosure, the communications device may include at least one of the following: a communications network element and a terminal.

In an embodiment of this disclosure, the communications network element may include at least one of the following: a core network network element and a radio access network network element.

In the embodiments of this disclosure, a core-network network element (CN network element) may include but is not limited to at least one of the following: a core network device, a core network node, a core network function, a core-network network element, a mobility management entity (MME), an access mobility management function (AMF), a session management function (SMF), a user plane function (UPF), a serving gateway (SGW), a packet data network gateway (PDN-GW), a policy control function (PCF), a policy and charging rules function unit (PCRF), a general packet radio service (GPRS) serving support node (SGSN), a gateway GPRS support node (GGSN), a unified data management (UDM), a unified data repository (UDR), a home subscriber server (HSS), and an AF.

In the embodiments of this disclosure, the RAN network element may include but is not limited to at least one of the following: a radio access network device, a radio access network node, a radio access network function, a radio access network network element, a 3GPP radio access network, a non-3GPP radio access network, a centralized unit (CU), a distributed unit (DU), a base station, an evolved NodeB (evolved Node B, eNB), a 5G NodeB (gNB), a radio network controller (RNC), a NodeB (NodeB), a non-3GPP interworking function (N3IWF), an access controller (AC) node, an access point (AP) device, a wireless local area network (WLAN) node, or an N3IWF.

The base station may be a base transceiver station (Base Transceiver Station, BTS) in a global system for mobile communications (GSM) or code division multiple access (CDMA) network, may be a NodeB (NodeB) in wideband CDMA (WCDMA), or may be an evolved NodeB (eNB or eNodeB) in LTE, or a 5G NodeB (gNB). This is not limited in the embodiments of this disclosure.

In the embodiments of this disclosure, the UE is a terminal. The terminal may include a relay supporting terminal functions and/or a terminal supporting relay functions. The terminal may also be referred to as a terminal device or user equipment (UE). The terminal may be a terminal-side device such as a mobile phone, a tablet computer (Tablet Personal Computer), a laptop computer (Laptop Computer), a personal digital assistant (PDA), a mobile internet device (MID), a wearable device (Wearable Device), or an in-vehicle device. It should be noted that a specific type of the terminal is not limited in the embodiments of this disclosure.

The following describes the method for supporting time-sensitive communication in the embodiments of this disclosure.

Referring to FIG. 4, an embodiment of this disclosure provides a method for supporting time-sensitive communication, applied to a first communications device. The first communications device includes but is not limited to at least one of the following: a UE and a first adapter. The method includes the following steps.

Step 41: Transmit first capability information and/or delay related information of UE.

Optionally, the first capability information may include at least one of the following:

information related to a delay between the UE and a first adapter;

bridge identification information of the first adapter;

information about a bandwidth supported by the first adapter;

transmission propagation delay related information of the first adapter;

bridge identification information of the UE and the first adapter as a whole;

information about a bandwidth supported by the UE and the first adapter as a whole; and transmission propagation delay related information of the UE and the first adapter as a whole.

The UE and the first adapter may be co-located as one device, or be connected through an interface (such as an N60 interface).

In an implementation, when the first communications device is the UE, the first communications device may transmit the first capability information to the network. In another implementation, when the first communications device is the first adapter, the first communications device may transmit the first capability information to the UE.

In an implementation, the first capability may be understood as a capability of a bridge formed by the UE and the first adapter as a whole. The first adapter may be a time-sensitive network adapter to which the UE is connected.

In an implementation, the UE obtains the first capability information from the first adapter.

(1.1) The information related to the bandwidth supported by the first adapter may be information related to an available bandwidth supported by the first adapter. The information about a bandwidth supported by the first adapter may be information about a bandwidth supported by a port of the first adapter. The port is a port connected to a bridge or an end station.

The information about a bandwidth supported by the UE and the first adapter as a whole is information related to an available bandwidth supported by the UE and the first adapter as a whole. The information about a bandwidth supported by the UE and the first adapter as a whole may be information about a bandwidth supported by a port of the UE and the first adapter as a whole. The port is a port connected to a bridge or an end station.

Optionally, the information about a bandwidth supported by a port includes at least one of the following: information related to the port, a bandwidth of the port, a bandwidth availability parameter of the port, or a transmission rate of the port.

In an implementation, the bandwidth availability parameter of the port may be defined in the IEEE 802.1Q series, for example, a bandwidth availability parameter (Bandwidth Availability Parameters).

In an implementation, the bandwidth of the port may be an available bandwidth of the port, and the transmission rate of the port may be an available transmission rate of the port.

(1.2) The transmission propagation delay related information of the first adapter may be transmission propagation delay related information of a port of the first adapter.

The transmission propagation delay related information of the UE and the first adapter as a whole may be transmission propagation delay related information of a port of the UE and the first adapter as a whole.

Optionally, the transmission propagation delay related information of a port includes at least one of the following: information related to the port, a transmission propagation delay of the port, or a traffic class (traffic class).

The transmission propagation delay of the port may be a time required for transmitting a data frame from the port of the first adapter or the port of the UE and the first adapter as a whole to a port of a connected station (a bridge or an end station).

(1.3) Optionally, the information related to a port may include at least one of the following: identification information of the port, information related to a direction of the port being an egress or an ingress, a port number, a MAC address of the port, an internet protocol (IP) address of the port, VLAN tag information associated with the port, and data filter information of the port.

Optionally, the data filter information of the port or the data filter information may include at least one of the following: virtual local area network (VLAN) tag information, a media access control (MAC) address, an IPv4 address, a port number, an IPv6 address, and indication information of the port, where the indication information of the port includes indication information of a transmitting port or indication information of a receiving port.

The VLAN tag information is also referred to as VLAN identification information (such as a VID). The VLAN tag information may include: a service VLAN tag (S-TAG) and/or a customer VLAN tag (C-TAG).

(1.4) Optionally, the traffic class is the number of transmission queues or a traffic type of the port. The traffic type may include at least one of the following: background (Background), best-effort (best effort), excellent effort (excellent effort), critical application (critical application), video (video), voice (voice), internetwork control (Internetwork control), and network control (Network control).

(1.5) Optionally, the information related to a delay between the UE and the first adapter includes at least one of the following: information related to a first interface, information related to a second interface, the delay between the UE and the first adapter, or a traffic class associated with a data packet. The traffic class is described above, and details are not repeated herein.

Optionally, the first interface may be a first port, where the first port is a port connected to a bridge or an end station. The second interface may include one of the following: a UU interface of the UE, and a port connected to the UU interface of the UE. The UU interface is an interface between the UE and a RAN.

The first port may be a port of the first adapter or a port of the UE. The port of the first adapter may be a port, connected to a bridge or an end station, of the first adapter. The port of the UE may be a port, connected to a bridge or an end station, of the UE.

Further, the UU interface of the UE includes a tunnel at the UU interface of the UE.

Further, the tunnel may include at least one of the following: a tunnel related to a port, a tunnel related to a VLAN, and a tunnel related to data filter information.

In an implementation, the first interface is a data ingress, and the second interface is a data egress. In another implementation, the second interface is a data ingress, and the first interface is a data egress.

In a case that the first interface is the first port, the information related to the first interface may be port-related information of the first port (the port-related information is described above, and details are not repeated herein).

In a case that the second interface is a UU interface of the UE, the information related to the second interface may be information about a first tunnel of the UU interface.

Further, the first tunnel may include at least one of the following: a tunnel related to a port, a tunnel related to a VLAN, and a tunnel related to data filter information. The port may be the first port (which may be a port of the first adapter or a port of the UE). The data filter information may be data filter information of the first port. The VLAN may be a VLAN associated with the first port.

Information about the tunnel related to the port includes at least one of the following: the port-related information of the port and identification information of the tunnel (such as a PDU session identifier and/or a QoS flow identifier).

Information about the tunnel related to the VLAN includes at least one of the following: VLAN tag information of the VLAN (the VLAN tag information is described above, and details are not repeated herein) and identification information of the tunnel (such as a PDU session identifier and/or a QoS flow identifier).

Information about the tunnel related to the data filter information includes at least one of the following: the data filter information (the data filter information is as described above, and details are not repeated herein) and identification information of the tunnel (such as a PDU session identifier and/or a QoS flow identifier).

When the tunnel is a QoS flow, the identification information of the tunnel may be a QoS flow identifier and/or a PDU session identifier to which the QoS flow belongs. When the tunnel is a PDU session, the identification information of the tunnel may be a PDU session identifier.

Optionally, the delay between the UE and the first adapter may be a bridge delay of the UE and the first adapter as a whole. In an implementation, the delay between the UE and the first adapter may be a time required for transmitting a data packet from a data ingress (such as the first interface or the second interface) to a data egress (such as the second interface or the first interface).

For example, in a case that the data ingress (such as the first interface or the second interface) is the UU interface of the UE, the data egress (such as the second interface or the first interface) may be the first port; or in a case that the data ingress is the first port, the data egress may be the UU interface of the UE.

(2.1) Further, the delay between the UE and the first adapter may be at least one of the following:
 a time required for transmitting a data packet from the first interface to the second interface; or
 a time required for transmitting a data packet from the second interface to the first interface.

In an implementation, the time required for transmitting a data packet from the first interface to the second interface is the same as the time required for transmitting a data packet from the second interface to the first interface. In another implementation, the time required for transmitting a data packet from the first interface to the second interface is different from the time required for transmitting a data packet from the second interface to the first interface.

Further, the time required for transmitting a data packet from the first interface to the second interface may be at least one of the following:
 a time required for transmitting a data packet from the first port to the UU interface of the UE; and
 a time required from receiving a data packet at the first port until preparing to transmit the data packet from the UU interface of the UE.

In an implementation, the time required for transmitting a data packet from the first port to the UU interface of the UE includes: the time required for transmitting the data packet from the first port to the first tunnel at the UU interface of the UE. The first tunnel is described above, and details are not repeated herein.

In an implementation, the time required from receiving a data packet at the first port until preparing to transmit the data packet from the UU interface of the UE includes: the time required from receiving the data packet at the first port until preparing to transmit the data packet from the UU interface of the UE to the first tunnel. The first tunnel is described above, and details are not repeated herein.

(2.2) Further, the time required for transmitting a data packet from the second interface to the first interface may be at least one of the following:
 a time required for transmitting a data packet from the UU interface of the UE to the first port; and
 a time required for receiving a data packet by the UE from the UU interface of the UE until transmitting the data packet to the first port.

In an implementation, the time required for receiving a data packet by the UE from the UU interface of the UE until transmitting the data packet to the first port includes at least one of the following: a time required for receiving a data packet by the UE from the first tunnel at the UU interface of the UE until transmitting the data packet to the first port, and a time required for parsing the data packet from a packet data convergence protocol (PDCP) layer of the first tunnel at the UU interface until transmitting the data packet to the first port.

In an implementation, the first tunnel may include at least one of the following: a tunnel related to a port, a tunnel related to a VLAN, and a tunnel related to data filter information. The port may be the first port, such as a port connected to a bridge or an end station (which may be a port of the first adapter or a port of the UE). The data filter information may be data filter information of the first port. The VLAN may be a VLAN associated with the first port.

(2.3) Further, the delay between the UE and the first adapter may include at least one of the following: a maximum delay between the UE and the first adapter and a minimum delay between the UE and the first adapter. The minimum delay between the UE and the first adapter may also be referred to as a minimum bridge delay of the UE and the first adapter as a whole, and the maximum delay between the UE and the first adapter is also referred to as a maximum bridge delay of the UE and the first adapter as a whole. The minimum delay between the UE and the first adapter may be further divided into a minimum delay, related to a size of a data packet, between the UE and the first adapter, and a minimum delay, unrelated to a size of a data packet, between the UE and the first adapter. The maximum delay between the UE and the first adapter may be further divided into a maximum delay, related to a size of a data packet, between the UE and the first adapter, and a maximum delay, unrelated to a size of a data packet, between the UE and the first adapter.

(2.4) Further, the delay between the UE and the first adapter may include at least one of the following: a downlink delay and an uplink delay.

The downlink delay may include one of the following:
 a time required for transmitting a data packet from the UE to the first adapter;
 a time required for transmitting a data packet from the second interface to the first interface;
 a time required for transmitting a data packet from the UU interface of the UE to the first port; and
 a time required for transmitting a data packet from the first tunnel at the UU interface of the UE to the first port.

The downlink delay may be referred to as a delay from the UE to the first adapter.

The uplink delay may include at least one of the following:
 a time required for transmitting a data packet from the first interface to the second interface;
 a time required for transmitting a data packet from the first adapter to the UE;
 a time required for transmitting a data packet from the first port to the UU interface of the UE;
 a time required from receiving a data packet at the first port until preparing to transmit the data packet from the UU interface of the UE;

a time required for transmitting a data packet from the first port to the first tunnel at the UU interface of the UE; or a time required from receiving a data packet at the first port until preparing to transmit the data packet from the first tunnel at the UU interface of the UE.

It is easy to understand that, for uplink data transmission, the UE needs to request the RAN for scheduling. A delay for waiting for scheduling by the RAN network element does not belong to the delay between the UE and the first adapter.

The uplink delay may be referred to as a delay from the first adapter to the UE.

In an implementation, the uplink delay and the downlink delay are the same. In another implementation, the uplink delay and the downlink delay are different.

(2.5) Optionally, the delay related information of the UE includes at least one of the following: information related to the first interface, information related to the second interface, the delay of the UE, and a traffic class associated with a data packet.

The information related to the first interface, the information related to the second interface, and the traffic class is described above, and details are not repeated herein.

The delay of the UE is a time required for transmitting a data packet from the data ingress (such as the first interface or the second interface) of the UE to the data egress (such as the second interface or the first interface) of the UE.

Further, the delay of the UE may be at least one of the following:

a time required for transmitting a data packet from the first interface to the second interface; or a time required for transmitting a data packet from the second interface to the first interface.

In an implementation, the first interface is the first port, and the first port is a port of the UE. The port of the UE may be a port, connected to a bridge or an end station, of the UE.

In an implementation, the time required for transmitting a data packet from the first interface to the second interface may include at least one of the following: a time required for transmitting a data packet from the UU interface of the UE to the first port, and a time required for receiving a data packet by the UE from the UU interface until transmitting the data packet to the first port.

In another implementation, the time required for transmitting a data packet from the second interface to the first interface may include at least one of the following: a time required for transmitting a data packet from the first port to the UU interface of the UE, and a time required for receiving a data packet from the first port until transmitting the data packet from the UU interface of the UE.

Optionally, the transmitting first capability information and/or delay related information of UE includes:

when a preset condition is met, transmitting the first capability information and/or the delay related information of UE.

The preset condition may be at least one of the following:

a request for the first capability information is received from a network;

a request for the delay related information of the UE is received from the network;

the type of the UE is a bridge; and the UE supports time-sensitive communication.

In this way, the first capability information and/or delay related information of the UE can be transmitted only when the preset condition is met, so as to avoid frequent transmission of the first capability information and/or delay related information of the UE, and reduce power consumption.

In an implementation, when the UE supports time-sensitive communication, the first capability information and/or the delay related information of the UE are transmitted.

Optionally, the transmitting first capability information and/or delay related information of UE includes:

transmitting the first capability information and/or the delay related information of the UE to a target end, where the target end includes: UE, a RAN network element, and a CN network element; when the first communications network element is the first adapter, the target end may be UE; when the first communications network element is UE, the target end may be a RAN network element and/or a CN network element; and the target end may be a communications network element that forms a bridge with the UE and/or the first adapter in the network.

The CN network element may include, but is not limited to, at least one of the following: a PCF, an AMF, an SMF, and an AF.

Optionally, after the step of transmitting the first capability information and/or the delay related information of the UE, the method further includes:

obtaining port configuration information, where the port configuration information includes at least one of the following: information related to a port, a bandwidth of the port, and a transmission rate of the port; and configuring the bandwidth and/or transmission rate of the port based on the port configuration information that is obtained.

The port configuration information may be transmitted by the network.

The port configuration information may be port configuration information of the first port. When the first communications device is the UE and the first port is the port of the first adapter, the UE transmits the port configuration information to the first adapter.

In this implementation, the bandwidth and/or transmission rate of the port is configured based on the port configuration information that is obtained, so that the configured port bandwidth is more suitable for transmission of time-sensitive data.

In this embodiment of this disclosure, the first communications device can provide the network with related capabilities of the UE and/or the first adapter as a whole, so as to support the network to determine the bridge capability of the bridge formed by the UE, the time-sensitive network adapter, and/or the network, and also to support configuration of time-sensitive data streams, thereby supporting time-sensitive communication.

Referring to FIG. 5, an embodiment of this disclosure further provides a method for supporting time-sensitive communication, applied to a second communications device. The second communications device includes, but is not limited to, a CN network element (such as an AMF, an SMF, a PCF, or an AF). The method includes the following steps.

Step 51: Obtain first information, where the first information includes at least one of the following: first capability information, second capability information, delay related information of UE, and/or delay related information of an anchor gateway.

Step 52: Perform a first operation based on the first information.

The first capability information is the first capability information in the embodiment shown in FIG. 4, and details are not repeated herein.

The delay related information of the UE is the first capability information in the embodiment shown in FIG. 4, and details are not repeated herein.

The delay related information of the anchor gateway is the second capability information in the embodiment shown in FIG. 7, and details are not repeated herein.

The second capability information is the second capability information in the embodiment shown in FIG. 7, and details are not repeated herein.

Optionally, the first capability information and/or the delay related information of the UE may be obtained from at least one of the following: the UE, a first communications device, and a RAN network element currently accessed by the UE.

Optionally, the second capability information and/or the delay related information of the anchor gateway may be obtained from at least one of the following: the UE, the anchor gateway, and a third communications device.

The anchor gateway is a gateway that terminates the N6 interface. Further, the anchor gateway may be an anchor gateway that establishes a tunnel related to a bridge or a tunnel related to a port.

The RAN network element is a RAN network element serving the UE.

Optionally, the first operation may be a time-sensitive related operation. For example, the first operation may include at least one of the following:
(1) determining a bridge capability of a bridge formed by the UE, a time-sensitive network adapter, and/or a network;
(2) determining second transmission configuration information for the time-sensitive data stream (such as user and/or network configuration information for the egress);
(3) transmitting configuration information of the time-sensitive data stream, where the configuration information for a time-sensitive data stream is the first transmission configuration information for the time-sensitive data stream or second transmission configuration information for the time-sensitive data stream;
(4) determining bridge configuration information; or
(5) disclosing or transmitting the bridge capability of the bridge formed by the UE, the time-sensitive network adapter, and/or the network.

The determining the bridge capability of the bridge formed by the UE, the time-sensitive network adapter, and/or the network includes at least one of the following:
determining an internal delay of a bridge formed by the UE and the network;
determining a bandwidth availability parameter of the bridge formed by the UE and the network;
determining an internal delay of the bridge formed by the UE, the time-sensitive network adapter, and the network;
determining a bandwidth availability parameter of the bridge formed by the UE, the time-sensitive network adapter, and the network; and
determining a delay between a first interface and a fourth interface.

The first interface may be a first port. The first port is a port, connected to a bridge or an end station, of the UE or a first adapter.

The fourth interface may be a second port. The second port is a port, connected to a bridge or an end station, of the anchor gateway or a second adapter.

In an implementation, the internal delay of the bridge formed by the UE and the network may be determined as a sum of the following: a delay of the UE, a delay between the UE and the RAN network element, a delay between the RAN network element and the anchor gateway, and a delay of the anchor gateway (that is, the sum of the delay of the UE+the delay between the UE and the RAN network element+the delay between the RAN network element and the anchor gateway+the delay of the anchor gateway).

In an implementation, the internal delay of the bridge formed by the UE, the time-sensitive network adapter, and the network may be determined as a sum of the following: a delay between the UE and the first adapter, a transmission delay between the UE and the RAN network element, a processing delay of the RAN network element, a delay between the RAN network element and the anchor gateway, and a delay between the anchor gateway and the second adapter (that is, the sum of the delay between the UE and the first adapter+the transmission delay between the UE and the RAN network element+the processing delay of the RAN network element+the delay between RAN network element and the anchor gateway+the delay between the anchor gateway and the second adapter).

In an implementation, the internal delay of the bridge is the delay between the first interface and the fourth interface. The first capability information includes information related to the first interface and information related to the second interface. The second capability information includes information related to a third interface and information related to the fourth interface.

The information related to the second interface may be the information about the first tunnel of the UU interface. The information related to the third interface may be the information about the first tunnel of the N3N9 interface. The first interface and the fourth interface are associated by using the information about the first tunnel. The first tunnel is as described in the embodiment of FIG. 4 and/or FIG. 7.

In an implementation, the delay between the first interface and the fourth interface may be a sum of the following: a time required for transmitting a data packet from the first interface to the second interface, a delay between the UE and the RAN network element, a delay between the RAN network element and the anchor gateway, and a time required for transmitting a data packet from the third interface to the fourth interface (that is, the sum of the time required for transmitting a data packet from the first interface to the second interface+the delay between the UE and the RAN network element+the delay between the RAN network element and the anchor gateway+the time required for transmitting a data packet from the third interface to the fourth interface).

In another implementation, the delay between the first interface and the fourth interface may be a sum of the following: a time required for transmitting a data packet from the second interface to the first interface, a delay between the UE and the RAN network element, a delay between the RAN network element and the anchor gateway, and a time required for transmitting a data packet from the fourth interface to the third interface (that is, the sum of the time required for transmitting a data packet from the second interface to the first interface+the delay between the UE and the RAN network element+the delay between the RAN network element and the anchor gateway+the time required for transmitting a data packet from the fourth interface to the third interface).

The transmission configuration information of the time-sensitive data stream is determined based on the first information.

The transmitting the configuration information for a time-sensitive data stream based on the first information may include at least one of the following:
- when a first condition is met, transmitting the configuration information for a time-sensitive data stream to the UE and/or the first adapter; and
- when a second condition is met, transmitting the configuration information for a time-sensitive data stream to the anchor gateway and/or the second adapter.

Optionally, the first condition includes at least one of the following:
- the time-sensitive data stream is downlink data (for example, when the UE is an egress of the bridge formed by the UE and the network);
- the type of the UE is a bridge;
- an architecture type of time-sensitive networking is fully distributed;
- the UE is an end station and the architecture type of time-sensitive networking is centralized-distributed hybrid; and
- indication information for the configuration information for a time-sensitive data stream indicates that the configuration information for a time-sensitive data stream is required.

Optionally, the second condition includes at least one of the following:
- the time-sensitive data stream is uplink data (for example, the port of the bridge formed by the anchor gateway and the network is the egress); and
- the architecture type of time-sensitive networking is fully distributed or centralized-distributed hybrid.

Optionally, after the step of performing the first operation, the method further includes:
- transmitting the determined bridge configuration information to at least one of the following: the UE, the anchor gateway, the first adapter, and the second adapter.

In an implementation, the bridge configuration information is transmitted to the first adapter through the UE; in another implementation, the bridge configuration information is transmitted to the second adapter through the anchor gateway.

The bridge configuration information is configuration information of the bridge egress.

Optionally, the bridge configuration information includes at least one of the following: information related to a port and a configured bandwidth of the port.

In an implementation, when the time-sensitive data stream is downlink data or when the UE is a bridge egress or the first adapter is a bridge egress, the bridge configuration information is transmitted to the UE. When the first adapter is a bridge egress, the UE may forward the bridge configuration information to the first adapter.

In another implementation, when the time-sensitive data stream is uplink data or when the anchor gateway is a bridge egress or the second adapter is a bridge egress, the bridge configuration information is transmitted to the anchor gateway and/or the second adapter. When the second adapter is a bridge egress, the anchor gateway may forward the bridge configuration information to the second adapter.

In this embodiment of this disclosure, the time-sensitive network adapter determines the bridge capability of the bridge formed by the UE, the time-sensitive network adapter, and/or the network based on the first information, configures the bridge egress, and configures time-sensitive data streams, so as to support time-sensitive communication.

Referring to FIG. 6, this disclosure further provides a method for supporting time-sensitive communication, applied to a time-sensitive network adapter. The time-sensitive network adapter includes but is not limited to at least one of the following: a first adapter and a second adapter. The method includes the following steps.

Step 61: Obtain bridge configuration information and/or configuration information for a time-sensitive data stream.

Step 62: Perform a second operation of time-sensitive communication based on the bridge configuration information and/or the configuration information for a time-sensitive data stream.

The bridge configuration information may be configuration information of a network egress.

Optionally, the bridge configuration information includes at least one of the following: information related to a port, a bandwidth of the port, and a transmission rate of the port.

The bandwidth of the port may be an available bandwidth of the port, and the transmission rate of the port may be an available transmission rate of the port.

The information related to a port is described in the embodiment of FIG. 4, and details are not repeated herein.

In an implementation, the performing the second operation related to time-sensitive communication based on the bridge configuration information and/or the configuration information for a time-sensitive data stream includes: configuring the bandwidth and/or transmission rate of the port based on obtained port configuration information.

In this embodiment of this disclosure, the bridge egress is configured to support time-sensitive communication.

Referring to FIG. 7, an embodiment of this disclosure provides a method for supporting time-sensitive communication, applied to a time-sensitive network adapter. The time-sensitive network adapter includes but is not limited to at least one of the following: an anchor gateway and a second adapter. The method includes the following steps.

Step 71: Transmit second capability information and/or delay related information of the anchor gateway.

Optionally, the second capability information may include at least one of the following:
- information related to a delay between the anchor gateway and the second adapter;
- bridge identification information of the second adapter;
- information about a bandwidth supported by the second adapter;
- transmission propagation delay related information of the second adapter;
- bridge identification information of the anchor gateway and the second adapter as a whole;
- information about a bandwidth supported by the anchor gateway and the second adapter as a whole; or
- transmission propagation delay related information of the anchor gateway and the second adapter as a whole.

The anchor gateway and the second adapter may be co-located as one device, or be connected through an interface.

In an implementation, when the time-sensitive network adapter is the anchor gateway, the time-sensitive network adapter may transmit the second capability information to the network. In another implementation, when the time-sensitive network adapter is the second adapter, the time-sensitive network adapter may transmit the second capability information to the anchor gateway.

The anchor gateway is a gateway (such as a UPF) that terminates the N6 interface.

In an implementation, the second capability may be understood as a capability of a bridge formed by the anchor gateway and the second adapter as a whole. The second adapter may be a time-sensitive network adapter to which the anchor gateway is connected.

In an implementation, the anchor gateway obtains the second capability information from the second adapter.

(1.1) The information related to the bandwidth supported by the second adapter may be information related to an available bandwidth supported by the second adapter. The information about a bandwidth supported by the second adapter may be information about a bandwidth supported by a port of the second adapter. The port is a port connected to a bridge or an end station.

The information about a bandwidth supported by the anchor gateway and the second adapter as a whole may be information related to an available bandwidth supported by the anchor gateway and the second adapter as a whole. The information about a bandwidth supported by the anchor gateway and the second adapter as a whole may be information about a bandwidth supported by a port of the anchor gateway and the second adapter as a whole. The port is a port connected to a bridge or an end station.

Optionally, the information about a bandwidth supported by a port includes at least one of the following: information related to the port, a bandwidth of the port, a bandwidth availability parameter of the port, or a transmission rate of the port.

In an implementation, the bandwidth availability parameter of the port may be defined in the IEEE 802.1Q series, for example, a bandwidth availability parameter (Bandwidth Availability Parameters).

In an implementation, the bandwidth of the port may be an available bandwidth of the port, and the transmission rate of the port may be an available transmission rate of the port.

(1.2) The transmission propagation delay related information of the second adapter may be transmission propagation delay related information of a port of the second adapter.

The transmission propagation delay related information of the anchor gateway and the second adapter as a whole is transmission propagation delay related information of a port of the anchor gateway and the second adapter as a whole.

Optionally, the transmission propagation delay related information of a port includes at least one of the following: information related to the port, a transmission propagation delay of the port, or a traffic class (traffic class).

The transmission propagation delay of the port may be a time required for transmitting a data frame from the port of the second adapter or the port of the anchor gateway and the second adapter as a whole to a port of a connected station (a bridge or an end station).

(1.3) Optionally, the information related to a port may include at least one of the following: identification information of the port, information related to a direction of the port being an egress or an ingress, a port number, a MAC address of the port, an IP address of the port, VLAN tag information associated with the port, and data filter information of the port.

Optionally, the data filter information of the port or the data filter information may include at least one of the following: virtual local area network (Virtual Local Area Network, VLAN) tag information, a media access control (MAC) address, an IPv4 address, a port number, an IPv6 address, and indication information of the port, where the indication information of the port includes indication information of a transmitting port or the indication information of a receiving port.

The VLAN tag information is also referred to as VLAN identification information (such as a VID). The VLAN tag information may include: a service VLAN tag (S-TAG) and/or a customer VLAN tag (C-TAG).

(1.4) Optionally, the traffic class is the number of transmission queues or a traffic type of the port. The traffic type may include at least one of the following: background (Background), best-effort (best effort), excellent effort (excellent effort), critical applications (critical application), video (video), voice (voice), internetwork control (Internetwork control), and network control (Network control).

(1.5) Optionally, the information related to a delay between the anchor gateway and the second adapter includes at least one of the following: information related to a fourth interface, information related to a third interface, the delay between the anchor gateway and the second adapter, and a traffic class associated with a data packet. The traffic class is described above, and details are not repeated herein.

Optionally, the fourth interface may be a second port, where the second port is a port connected to a bridge or an end station. The third interface may include one of the following: an N3N9 interface of the anchor gateway, a port connected to the N3N9 interface of the anchor gateway, an N6 interface, and a port connected to the N6 interface. The N3N9 interface is an N3 or N9 interface. The N3 interface is an interface between a gateway and a RAN. The N9 interface is an interface between gateways. The N6 interface is an interface between the anchor gateway and an external network.

The second port may be a port of the second adapter or a port of the anchor gateway. The port of the second adapter may be a port, connected to a bridge or an end station, of the second adapter. The port of the anchor gateway may be a port, connected to a bridge or an end station, of the anchor gateway.

Further, the N3N9 interface of the anchor gateway includes a tunnel at the N3N9 interface of the anchor gateway.

Further, the tunnel may include at least one of the following: a tunnel related to a port, a tunnel related to a VLAN, and a tunnel related to data filter information.

In an implementation, the fourth interface is a data ingress, and the third interface is a data egress. In another implementation, the third interface is a data ingress, and the fourth interface is a data egress.

When the fourth interface is the second port, the information related to the fourth interface may be port-related information of the second port (the port-related information is described above, and details are not repeated herein).

In a case that the third interface is an N3N9 interface of the anchor gateway, the information related to the third interface may be information about a first tunnel of the N3N9 interface.

Further, the first tunnel may include at least one of the following: a tunnel related to a port, a tunnel related to a VLAN, and a tunnel related to data filter information. The port may be the second port (which may be a port of the second adapter or a port of the anchor gateway). The data filter information may be data filter information of the second port. The VLAN may be a VLAN associated with the second port.

Information about the tunnel related to the port includes at least one of the following: the port-related information of the port, and identification information of a tunnel (such as a PDU session identifier and/or a QoS flow identifier).

Information about the tunnel related to the VLAN includes at least one of the following: VLAN tag information of the VLAN (the VLAN tag information is described above, and details are not repeated herein) and tunnel identification information (such as a PDU session identifier and/or a QoS flow identifier).

Information about the tunnel related to the data filter information includes at least one of the following: the data filter information (the data filter information is as described above, and details are not repeated herein) and tunnel identification information (such as a PDU session identifier and/or a QoS flow identifier).

When the tunnel is a QoS flow, the identification information of the tunnel may be a QoS flow identifier and/or a PDU session identifier to which the QoS flow belongs. When the tunnel is a PDU session, the identification information of the tunnel may be a PDU session identifier.

Optionally, the delay between the anchor gateway and the second adapter may also be referred to as a bridge delay of the anchor gateway and the second adapter as a whole. In an implementation, the delay between the anchor gateway and the second adapter may be a time required for transmitting a data packet from a data ingress (such as the fourth interface or the third interface) to a data egress (such as the third interface or the fourth interface).

For example: when the data ingress (such as the fourth interface or the third interface) is the N3N9 interface of the anchor gateway, the data egress (such as the third interface or the fourth interface) may be the second port; or when the data ingress is the second port, the data egress may be the N3N9 interface of the anchor gateway.

(2.1) Further, the delay between the anchor gateway and the second adapter may be at least one of the following:
a time required for transmitting a data packet from the fourth interface to the third interface; and
a time required for transmitting a data packet from the third interface to the fourth interface.

In an implementation, the time required for transmitting a data packet from the fourth interface to the third interface is the same as the time required for transmitting a data packet from the third interface to the fourth interface. In another implementation, the time required for transmitting a data packet from the fourth interface to the third interface is different from the time required for transmitting a data packet from the third interface to the fourth interface.

Further, the time required for transmitting a data packet from the fourth interface to the third interface may be at least one of the following:
a time required for transmitting a data packet from the second port to the N3N9 interface of the anchor gateway; and
a time required from receiving a data packet at the second port until preparing to transmit the data packet from the N3N9 interface of the anchor gateway.

In an implementation, the time required for transmitting a data packet from the second port to the N3N9 interface of the anchor gateway includes: the time required for transmitting the data packet from the port of the second adapter to a first tunnel at the N3N9 interface of the anchor gateway. The first tunnel is described above, and details are not repeated herein.

In an implementation, the time required from receiving a data packet at the second port until preparing to transmit the data packet from the N3N9 interface of the anchor gateway includes: the time required from receiving the data packet at the second port until preparing to transmit the data packet from the N3N9 interface of the anchor gateway to the first tunnel. The first tunnel is described above, and details are not repeated herein.

(2.2) Further, the time required for transmitting a data packet from the third interface to the fourth interface may be at least one of the following:
a time required for transmitting a data packet from the N3N9 interface of the anchor gateway to the second port; and
a time required for transmitting a data packet from the N3N9 interface by the anchor gateway until transmitting the data packet to the second port.

In an implementation, the time required for transmitting a data packet from the N3N9 interface by the anchor gateway until transmitting the data packet to the second port includes at least one of the following: a time required for transmitting the data packet from a first tunnel of the N3N9 interface by the anchor gateway until transmitting the data packet to the second port; and a time required for parsing the data packet from a GTP-U layer of the first tunnel at the N3N9 interface by the anchor gateway until transmitting the data packet to the second port.

In an implementation, the first tunnel may include at least one of the following: a tunnel related to a port, a tunnel related to a VLAN, and a tunnel related to data filter information. The port may be the second port, such as a port connected to a bridge or an end station (which may be a port of the second adapter or a port of the anchor gateway). The data filter information may be data filter information of the second port. The VLAN may be a VLAN associated with the second port.

(2.3) Further, the delay between the anchor gateway and the second adapter may include at least one of the following: a maximum delay between the anchor gateway and the second adapter and a minimum delay between the anchor gateway and the second adapter. The minimum delay between the anchor gateway and the second adapter may also be referred to as a minimum bridge delay of the anchor gateway and the second adapter as a whole, and the maximum delay between the anchor gateway and the second adapter is also referred to as a maximum bridge delay of the anchor gateway and the second adapter as a whole. The minimum delay between the anchor gateway and the second adapter may be further divided into a minimum delay, related to a size of a data packet, between the anchor gateway and the second adapter, and a minimum delay, unrelated to a size of a data packet, between the anchor gateway and the second adapter. The maximum delay between the anchor gateway and the second adapter may be further divided into a maximum delay, related to a size of a data packet, between the anchor gateway and the second adapter, and a maximum delay, unrelated to a size of a data packet, between the anchor gateway and the second adapter.

(2.4) Further, the delay between the anchor gateway and the second adapter may include at least one of the following: a downlink delay and an uplink delay.

The downlink delay may include one of the following:
a time required for transmitting a data packet from the anchor gateway to the second adapter;
a time required for transmitting a data packet from the third interface to the fourth interface;
a time required for transmitting a data packet from the N3N9 interface of the anchor gateway to the second port; and a time required for transmitting a data packet from the first tunnel at the N3N9 interface of the anchor gateway to the second port. The downlink delay may be referred to as a delay from the anchor gateway to the second adapter.

The uplink delay may include at least one of the following:

a time required for transmitting a data packet from the fourth interface to the third interface;

a time required for transmitting a data packet from the second adapter to the anchor gateway;

a time required for transmitting a data packet from the second port to the N3N9 interface of the anchor gateway;

a time required from receiving a data packet at the second port until preparing to transmit the data packet from the N3N9 interface of the anchor gateway;

a time required for transmitting a data packet from the second port to the first tunnel at the N3N9 interface of the anchor gateway; and a time required from receiving a data packet at the second port until preparing to transmit the data packet from the first tunnel at the N3N9 interface of the anchor gateway.

It is easy to understand that uplink data transmission requires the anchor gateway to request the RAN for scheduling. A delay for waiting for scheduling by the RAN network element does not belong to the delay between the anchor gateway and the second adapter.

The uplink delay may be referred to as a delay from the second adapter to the anchor gateway.

In an implementation, the uplink delay and the downlink delay are the same. In another implementation, the uplink delay and the downlink delay are different.

(2.5) Optionally, the delay related information of the anchor gateway includes at least one of the following: information related to the fourth interface, information related to the third interface, the delay of the anchor gateway, and a traffic class associated with a data packet.

The information related to the fourth interface, the information related to the third interface, and the traffic class is described above, and details are not repeated herein.

The delay of the anchor gateway is a time required for transmitting a data packet from the data ingress of the anchor gateway (such as the fourth interface or the third interface) to the data egress of the anchor gateway (such as the third interface or the fourth interface).

Further, the delay of the anchor gateway may be at least one of the following:

a time required for transmitting a data packet from the fourth interface to the third interface; and a time required for transmitting a data packet from the third interface to the fourth interface.

In an implementation, the fourth interface is the second port, and the second port is a port of the anchor gateway. The port of the anchor gateway may be a port, connected to a bridge or an end station, of the anchor gateway.

In an implementation, the time required for transmitting a data packet from the fourth interface to the third interface may include at least one of the following: a time required for transmitting a data packet from the N3N9 interface of the anchor gateway to the second port, and a time required for receiving a data packet by the anchor gateway from the N3N9 interface until transmitting the data packet to the second port.

In another implementation, the time required for transmitting a data packet from the third interface to the fourth interface may include at least one of the following: a time required for transmitting a data packet from the second port to the N3N9 interface of the anchor gateway, and a time required for receiving a data packet from the second port until transmitting the data packet to the N3N9 interface of the anchor gateway.

Optionally, the transmitting second capability information and/or delay related information of an anchor gateway includes: transmitting the second capability information and/or the delay related information of the anchor gateway when a preset condition is met.

The preset condition may be at least one of the following:

a request for the second capability information is received from a network;

a request for the delay related information of the anchor gateway is received from the network;

the type of the anchor gateway is a bridge; and the anchor gateway supports time-sensitive communication.

In this way, the second capability information and/or the delay related information of the anchor gateway can be transmitted only when the preset condition is met, so as to avoid frequent transmission of the second capability information and/or the delay related information of the anchor gateway, and reduce power consumption.

In an implementation, when the anchor gateway supports time-sensitive communication, the second capability information and/or the delay related information of the anchor gateway are transmitted.

Optionally, the transmitting second capability information and/or delay related information of the anchor gateway includes:

transmitting the second capability information and/or the delay related information of the anchor gateway to a target end, where the target end includes: an anchor gateway, a RAN network element, and a CN network element; when the first communications network element is the second adapter, the target end may be the anchor gateway; when the first communications network element is the anchor gateway, the target end may be a RAN network element and/or a CN network element; and the target end may be a communications network element that forms a bridge with the anchor gateway and/or the second adapter in the network.

The CN network element may include, but is not limited to, at least one of the following: a PCF, an AMF, an SMF, and an AF.

Optionally, after the step of transmitting the second capability information and/or the delay related information of the anchor gateway, the method further includes:

obtaining port configuration information, where the port configuration information includes at least one of the following: information related to a port, a bandwidth of the port, and a transmission rate of the port; and configuring the bandwidth and/or transmission rate of the port based on the port configuration information that is obtained.

The port configuration information may be transmitted by the network.

The port configuration information may be port configuration information of the second port. When the third communications device is the anchor gateway and the second port is the port of the second adapter, the anchor gateway transmits the port configuration information to the second adapter.

In this implementation, the bandwidth and/or transmission rate of the port is configured based on the port configuration information that is obtained, so that the configured port bandwidth is more suitable for transmission of time-sensitive data.

In this embodiment of this disclosure, the time-sensitive network adapter can provide the network with related capabilities of the anchor gateway and/or the second adapter as a whole, so as to support the network to determine the bridge capability of the bridge formed by the anchor gateway, the time-sensitive network adapter, and/or the network, and also to support configuration of time-sensitive data streams, thereby supporting time-sensitive communication.

The following describes the method for supporting time-sensitive communication in the embodiments of this disclosure with reference to specific application scenarios.

Figure 8:
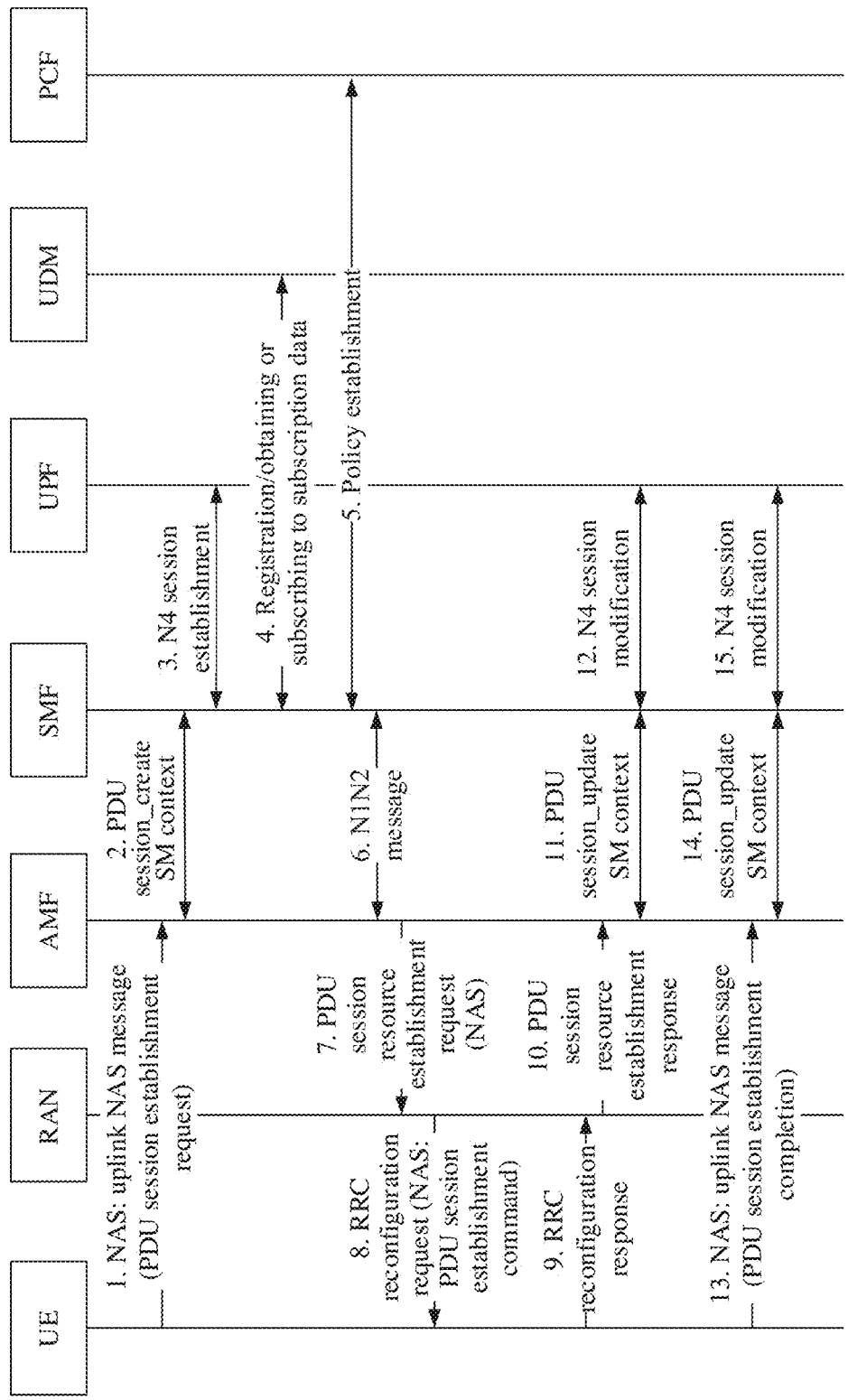
FIG. 8 is a flowchart of another method for supporting time-sensitive communication according to an embodiment of this disclosure.

Application scenario 1 in the embodiments of this disclosure:

The application scenario 1 in the embodiments of this disclosure mainly describes a process in which UE requests establishment of a PDU (protocol data unit) session. Referring to FIG. 8, the following steps are included:

Step 1: UE transmits first capability information and/or delay related information of the UE to an AMF (as described in the embodiment of FIG. 4).

The UE transmits an uplink non-access stratum (NAS) message to the AMF, where the NAS message includes a PDU session establishment request. The PDU session establishment request includes the first capability information and/or the delay related information of the UE (as described in the embodiment of FIG. 4).

Step 2: The AMF transmits a PDU session_create session management (Session Management, SM) context message to an SMF.

Step 3: The SMF selects a UPF, and the SMF transmits an N4 session establishment to the selected UPF. The SMF obtains second capability information and/or information of a delay related to an anchor gateway from the UPF (as described in the embodiment of FIG. 7).

Step 4: The SMF registers the terminal to a unified data management (UDM). The SMF may also obtain and subscribe to subscription data of the terminal.

Step 5: The SMF obtains a policy of the terminal from a PCF.

The SMF transmits obtained first information to the PCF (as described in the embodiment of FIG. 5), for example, determining a bridge capability (such as a bridge delay) of a bridge formed by the UE, a time-sensitive network adapter, and/or a network; The PCF transmits the bridge capability to an AF. The AF transmits the bridge capability to a CNC.

Step 6: The SMF transmits an N1N2 message to the AMF, where the N1N2 message contains a NAS message for PDU session establishment accept.

Step 7: The AMF transmits a PDU session resource establishment request message to a RAN network element, where the request message includes a NAS message for PDU session establishment.

Step 8: The RAN network element transmits an RRC reconfiguration request to the UE, where the request is a NAS message, including a PDU session establishment command.

Step 9: The UE returns an RRC reconfiguration response to the RAN network element.

Step 10: The RAN network element returns a PDU session resource establishment response to the AMF.

Step 11: The AMF transmits an SM context update request to the SMF.

Step 12: The SMF transmits, to the UPF, an N4 session update, which is also referred to as an N4 session modification.

Step 13: The UE transmits an uplink NAS message to the AMF, where the message indicates PDU session establishment completion.

Step 14: The SMF transmits an SM context update response to the AMF.

Step 15: The SMF transmits, to the UPF, an N4 session update, which is also referred to as an N4 session modification.

In the application scenario 1, during PDU session establishment, the UE provides the network with the first capability information and/or the delay related information of the UE, and the anchor gateway provides the network with the second capability information and/or the delay related information of the anchor gateway. The network can determine, based on the foregoing information, the capability of the bridge formed by the UE, the time-sensitive network adapter, and/or the network, and discloses the capability to the outside (such as a CNC). The CNC may determine, based on the bridge capability, user and/or network configuration information of the bridge formed by the UE and the network, so as to support implementation of time-sensitive networking.

Figure 9:
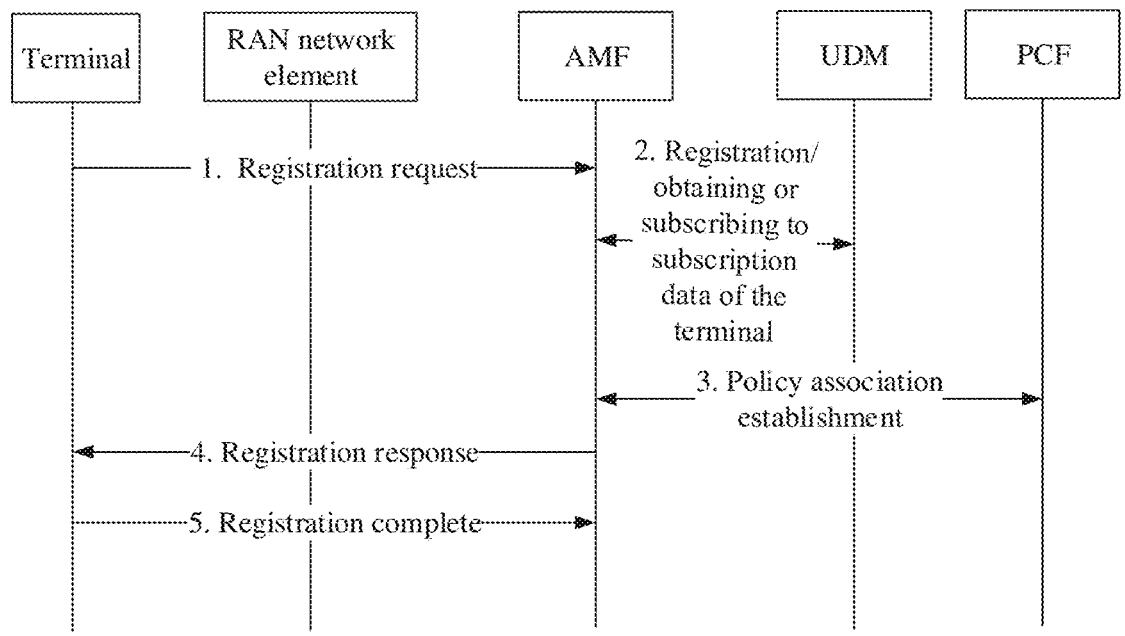
FIG. 9 is a flowchart of another method for supporting time-sensitive communication according to an embodiment of this disclosure.

Application scenario 2 in the embodiments of this disclosure:

In the application scenario 2 in the embodiments of this disclosure, a registration request process of the UE is mainly described. Referring to FIG. 9, the following steps are included:

Step 1: UE transmits a registration request message to an AMF, where the registration request message includes first capability information and/or delay related information of the UE (as described in the embodiment of FIG. 4).

Step 2: The AMF registers the terminal to a unified data management (UDM). The SMF may also obtain and subscribe to subscription data of the terminal.

Step 3: A policy association related to the UE is established between the AMF and a PCF. The AMF may obtain a policy of the terminal from the PCF.

Step 4: The AMF returns a registration response to the terminal.

Step 5: The terminal returns a registration completion to the AMF.

The AMF transmits the obtained first capability information and/or delay related information of the UE to the PCF. The PCF performs a first operation (as described in the embodiment of FIG. 5) of time sensitivity based on the first capability information and/or the delay related information of the UE, for example, determining a bridge capability (such as a bridge delay) of a bridge formed by the UE, a time-sensitive network adapter, and/or a network. The PCF transmits the bridge capability to an AF. The AF transmits the bridge capability to a CNC.

In the embodiments of this disclosure, in the UE registration process, the UE provides the first capability information to the network. The network can determine, based on the first capability information, the bridge capability of the bridge formed by the UE, the time-sensitive network adapter, and/or the network, and discloses the capability to the outside (such as a CNC). The CNC may determine, based on the capability of the bridge, the user and/or network configuration information of the bridge formed by the UE and the network. When receiving the user and/or network configuration information, the network may trigger the UE to establish a PDU session related to the bridge, so as to support implementation of time-sensitive networking.

Figure 10:
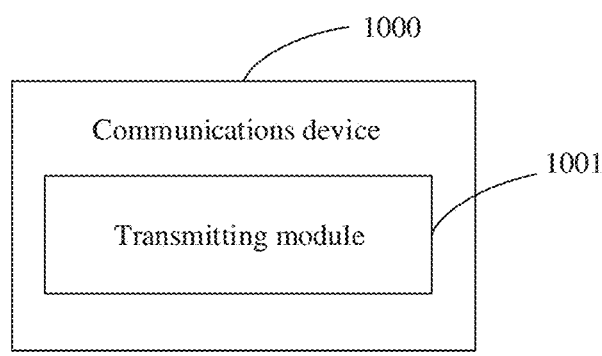
FIG. 10 is a structural diagram of a communications device according to this disclosure.

Referring to FIG. 10, an embodiment of this disclosure provides a communications device. The communications device is a first communications device. The first communications device includes, but is not limited to, UE. As shown in FIG. 10, the communications device 1000 includes:
- a transmitting module 1001, configured to transmit first capability information and/or delay related information of UE.

The first capability information includes at least one of the following:
- information related to a delay between the UE and a first adapter;
- bridge identification information of the first adapter;
- information about a bandwidth supported by the first adapter;
- transmission propagation delay related information of the first adapter;
- bridge identification information of the UE and the first adapter as a whole;
- information about a bandwidth supported by the UE and the first adapter as a whole; and
- transmission propagation delay related information of the UE and the first adapter as a whole.

The information related to a delay between the UE and the first adapter is described in the embodiment of FIG. 4, and details are not repeated herein.

The bridge identification information of the first adapter is described in the embodiment of FIG. 4, and details are not repeated herein.

The information about a bandwidth supported by the first adapter is described in the embodiment of FIG. 4, and details are not repeated herein.

The transmission propagation delay related information of the first adapter is described in the embodiment of FIG. 4, and details are not repeated herein.

The bridge identification information of the UE and the first adapter as a whole is described in the embodiment of FIG. 4, and details are not repeated herein.

The information about a bandwidth supported by the UE and the first adapter as a whole is described in the embodiment of FIG. 4, and details are not repeated herein.

The transmission propagation delay related information of the UE and the first adapter as a whole is described in the embodiment of FIG. 4, and details are not repeated herein.

The delay related information of the UE is described in the embodiment of FIG. 4, and details are not repeated herein.

Optionally, the transmitting first capability information and/or delay related information of UE includes:
- when a preset condition is met, transmitting the first capability information and/or the delay related information of UE.

The preset condition is at least one of the following:
- a request for the first capability information is received from a network;
- a request for the delay related information of the UE is received from the network;
- the type of the UE is a bridge; and
- the UE supports time-sensitive communication.

Optionally, the transmitting first capability information and/or delay related information of UE includes:
- transmitting the first capability information and/or the delay related information of the UE to a target end, where the target end includes: UE, a RAN network element, and a CN network element; when the first communications network element is the first adapter, the target end may be UE; when the first communications network element is UE, the target end may be a RAN network element and/or a CN network element; and the target end may be a communications network element that forms a bridge with the UE and/or the first adapter in the network.

The CN network element may include, but is not limited to, at least one of the following: a PCF, an AMF, an SMF, and an AF.

Figure 11:
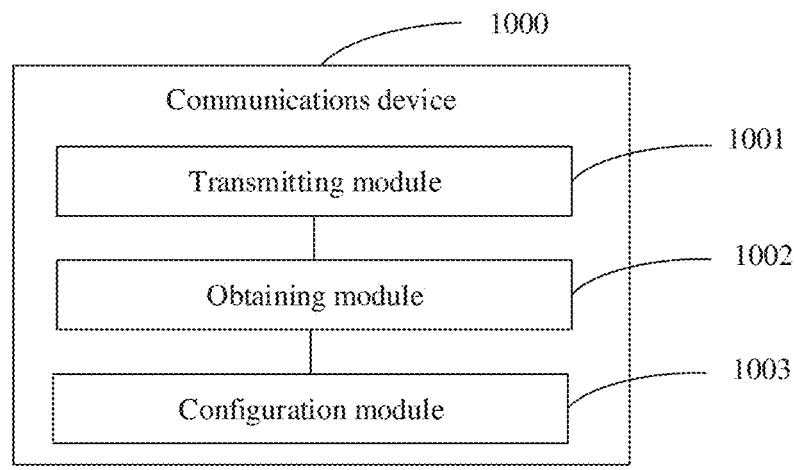
FIG. 11 is a structural diagram of another communications device according to this disclosure.

Optionally, as shown in FIG. 11, the communications device 1000 further includes:
- an obtaining module 1002, configured to obtain port configuration information, where
  the port configuration information includes at least one of the following: information related to a port, a bandwidth of the port, and a transmission rate of the port; and
- a configuration module 1003, configured to configure the bandwidth and/or transmission rate of the port based on the port configuration information that is obtained.

The port configuration information may be transmitted by the network.

The port configuration information may be port configuration information of the first port. When the first communications device is the UE and the first port is the port of the first adapter, the UE transmits the port configuration information to the first adapter.

Optionally, the transmitting first capability information and/or delay related information of UE includes:
- transmitting the first capability information and/or the delay related information of the UE to a target end.

The target end includes: UE, a RAN network element, and a CN network element.

The communications device 1000 is capable of implementing the processes implemented by the first communications device in the method embodiments of this disclosure, with the same beneficial effects achieved. To avoid repetition, details are not described herein again.

Figure 12:
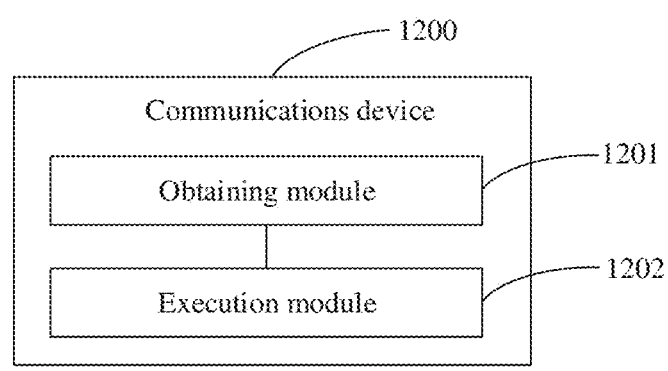
FIG. 12 is a structural diagram of another communications device according to this disclosure.

Referring to FIG. 12, an embodiment of this disclosure provides another communications device. The communications device is a second communications device. The second communications device includes, but is not limited to, a CN network element (such as an AMF, an SMF, a PCF, or an AF). As shown in FIG. 12, the communications device 1200 includes:
- an obtaining module 1201, configured to obtain first information, where the first information includes at least one of the following: first capability information, second capability information, delay related information of UE, and/or delay related information of an anchor gateway; and
- an execution module 1202, configured to perform a first operation based on the first information.

The first capability information is the first capability information in the embodiment shown in FIG. 4, and details are not repeated herein.

The delay related information of the UE is the first capability information in the embodiment shown in FIG. 4, and details are not repeated herein.

The delay related information of the anchor gateway is the second capability information in the embodiment shown in FIG. 7, and details are not repeated herein.

The second capability information is the second capability information in the embodiment shown in FIG. 7, and details are not repeated herein.

Optionally, the first operation includes at least one of the following:
- (1) determining a bridge capability of a bridge formed by the UE, a time-sensitive network adapter, and/or a network;
- (2) determining second transmission configuration information for the time-sensitive data stream (such as user and/or network configuration information for the egress);
- (3) transmitting configuration information of the time-sensitive data stream, where the configuration information for a time-sensitive data stream is the first transmission configuration information for the time-sensitive data stream or second transmission configuration information for the time-sensitive data stream;
- (4) determining bridge configuration information; or
- (5) disclosing or transmitting the bridge capability of the bridge formed by the UE, the time-sensitive network adapter, and/or the network.

The determining the bridge capability of the bridge formed by the UE, the time-sensitive network adapter, and/or the network includes at least one of the following:
- determining an internal delay of a bridge formed by the UE and the network;
- determining a bandwidth availability parameter of the bridge formed by the UE and the network;
- determining an internal delay of the bridge formed by the UE, the time-sensitive network adapter, and the network;
- determining a bandwidth availability parameter of the bridge formed by the UE, the time-sensitive network adapter, and the network; and
- determining a delay between a first interface and a fourth interface.

The first interface may be a first port. The first port is a port, connected to a bridge or an end station, of the UE or a first adapter.

The fourth interface may be a second port. The second port is a port, connected to a bridge or an end station, of the anchor gateway or a second adapter.

In an implementation, the internal delay of the bridge formed by the UE and the network may be determined as a sum of the following: a delay of the UE, a delay between the UE and the RAN network element, a delay between the RAN network element and the anchor gateway, and a delay of the anchor gateway (that is, the sum of the delay of the UE+the delay between the UE and the RAN network element+the delay between the RAN network element and the anchor gateway+the delay of the anchor gateway).

In an implementation, the internal delay of the bridge formed by the UE, the time-sensitive network adapter, and the network may be determined as a sum of the following: a delay between the UE and the first adapter, a transmission delay between the UE and the RAN network element, a processing delay of the RAN network element, a delay between the RAN network element and the anchor gateway, and a delay between the anchor gateway and the second adapter (that is, the sum of the delay between the UE and the first adapter+the transmission delay between the UE and the RAN network element+the processing delay of the RAN network element+the delay between RAN network element and the anchor gateway+the delay between the anchor gateway and the second adapter).

In an implementation, the internal delay of the bridge is the delay between the first interface and the fourth interface. The first capability information includes information related to the first interface and information related to the second interface. The second capability information includes information related to a third interface and information related to the fourth interface.

The information related to the second interface may be the information about the first tunnel of the UU interface. The information related to the third interface may be the information about the first tunnel of the N3N9 interface. The first interface and the fourth interface are associated by information about the first tunnel. The first tunnel is as described in the embodiment of FIG. 4 and/or FIG. 7.

In an implementation, the delay between the first interface and the fourth interface may be a sum of the following: a time required for transmitting a data packet from the first interface to the second interface, a delay between the UE and the RAN network element, a delay between the RAN network element and the anchor gateway, and a time required for transmitting a data packet from the third interface to the fourth interface (that is, the sum of the time required for transmitting a data packet from the first interface to the second interface+the delay between the UE and the RAN network element+the delay between the RAN network element and the anchor gateway+the time required for transmitting a data packet from the third interface to the fourth interface).

In another implementation, the delay between the first interface and the fourth interface may be a sum of the following: a time required for transmitting a data packet from the second interface to the first interface, a delay between the UE and the RAN network element, a delay between the RAN network element and the anchor gateway, and a time required for transmitting a data packet from the fourth interface to the third interface (that is, the sum of the time required for transmitting a data packet from the second interface to the first interface+the delay between the UE and the RAN network element+the delay between the RAN network element and the anchor gateway+the time required for transmitting a data packet from the fourth interface to the third interface).

The transmission configuration information of the time-sensitive data stream is determined based on the first information.

The transmitting the configuration information for a time-sensitive data stream based on the first information may include at least one of the following:
- when a first condition is met, transmitting the configuration information for a time-sensitive data stream to the UE and/or the first adapter; and
- when a second condition is met, transmitting the configuration information for a time-sensitive data stream to the anchor gateway and/or the second adapter.

Optionally, the first condition includes at least one of the following:
- the time-sensitive data stream is downlink data (for example, when the UE is an egress of the bridge formed by the UE and the network);
- the type of the UE is a bridge;
- an architecture type of time-sensitive networking is fully distributed;
- the UE is an end station and the architecture type of time-sensitive networking is centralized-distributed hybrid; and
- indication information for the configuration information for a time-sensitive data stream indicates that the configuration information for a time-sensitive data stream is required.

Optionally, the second condition includes at least one of the following:
  the time-sensitive data stream is uplink data (for example, the port of the bridge formed by the anchor gateway and the network is the egress); and
  the architecture type of time-sensitive networking is fully distributed or centralized-distributed hybrid.

Figure 13:
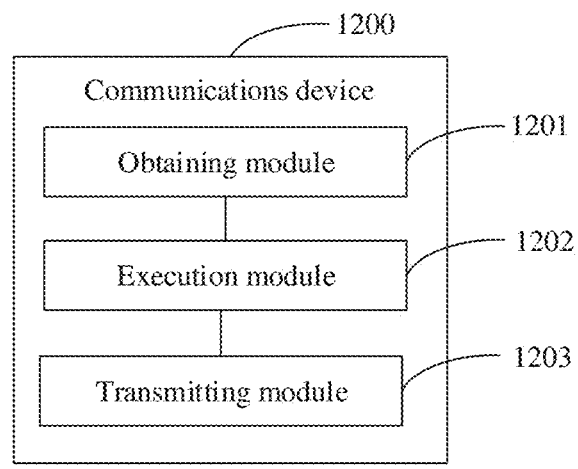
FIG. 13 is a structural diagram of another communications device according to this disclosure.

Optionally, as shown in FIG. 13, the communications device 1200 further includes:
  a transmitting module 1203, configured to transmit the determined bridge configuration information to at least one of the following:
  the UE, the anchor gateway, the first adapter, and the second adapter.

Optionally, the bridge configuration information includes at least one of the following: information related to a port and a configured bandwidth of the port.

In an implementation, the bridge configuration information is transmitted to the first adapter through the UE; in another implementation, the bridge configuration information is transmitted to the second adapter through the anchor gateway.

The bridge configuration information is configuration information of the bridge egress.

Optionally, the bridge configuration information includes at least one of the following: information related to a port and a configured bandwidth of the port.

In an implementation, when the time-sensitive data stream is downlink data or when the UE is a bridge egress or the first adapter is a bridge egress, the bridge configuration information is transmitted to the UE. When the first adapter is a bridge egress, the UE may forward the bridge configuration information to the first adapter.

In another implementation, when the time-sensitive data stream is uplink data or when the anchor gateway is a bridge egress or the second adapter is a bridge egress, the bridge configuration information is transmitted to the anchor gateway and/or the second adapter. When the second adapter is a bridge egress, the anchor gateway may forward the bridge configuration information to the second adapter.

The communications device 1200 is capable of implementing the processes implemented by the second communications device in the method embodiments of this disclosure, with the same beneficial effects achieved. To avoid repetition, details are not described herein again.

Figure 14:
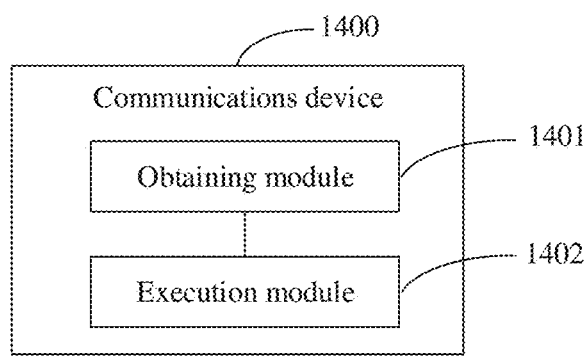
FIG. 14 is a structural diagram of another communications device according to this disclosure.

Referring to FIG. 14, an embodiment of this disclosure provides another communications device. The communications device is a time-sensitive network adapter. The time-sensitive network adapter includes but is not limited to at least one of the following: a first adapter and a second adapter. As shown in FIG. 14, the communications device 1400 includes:
  an obtaining module 1401, configured to obtain bridge configuration information and/or configuration information for a time-sensitive data stream; and
  an execution module 1402, configured to perform a second operation of time-sensitive communication based on the bridge configuration information and/or the configuration information for a time-sensitive data stream.

Optionally, the bridge configuration information includes at least one of the following: information related to a port, a bandwidth of the port, and a transmission rate of the port.

Optionally, the second operation includes:
  configuring the bandwidth and/or transmission rate of the port based on obtained port configuration information.

The communications device 1400 is capable of implementing the processes implemented by the time-sensitive network adapter in the method embodiments of this disclosure, with the same beneficial effects achieved. To avoid repetition, details are not described herein again.

Figure 15:
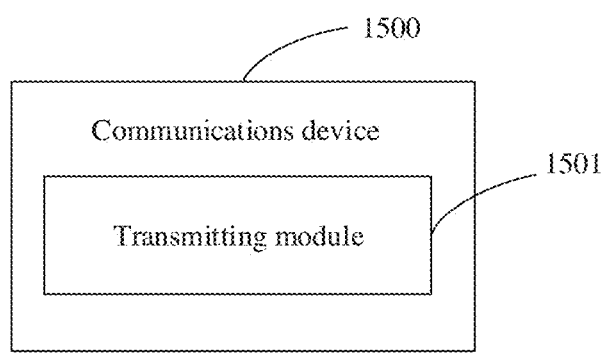
FIG. 15 is a structural diagram of another communications device according to this disclosure.

Referring to FIG. 15, an embodiment of this disclosure provides another communications device. The communications device is a third communications device. The third communications device includes, but is not limited to, at least one of the following: an anchor gateway and a second adapter. As shown in FIG. 15, the communications device 1500 includes:
  a transmitting module 1501, configured to transmit second capability information and/or delay related information of an anchor gateway.

The second capability information may include at least one of the following:
  information related to a delay between the anchor gateway and the second adapter;
  bridge identification information of the second adapter;
  information about a bandwidth supported by the second adapter;
  transmission propagation delay related information of the second adapter;
  bridge identification information of the anchor gateway and the second adapter as a whole;
  information about a bandwidth supported by the anchor gateway and the second adapter as a whole; or
  transmission propagation delay related information of the anchor gateway and the second adapter as a whole.

The information related to a delay between the anchor gateway and the second adapter is described in the embodiment of FIG. 7, and details are not repeated herein.

The bridge identification information of the second adapter is described in the embodiment of FIG. 7, and details are not repeated herein.

The information about a bandwidth supported by the second adapter is described in the embodiment of FIG. 7, and details are not repeated herein.

The transmission propagation delay related information of the second adapter is described in the embodiment of FIG. 7, and details are not repeated herein.

The bridge identification information of the anchor gateway and the second adapter as a whole is described in the embodiment of FIG. 7, and details are not repeated herein.

The information about a bandwidth supported by the anchor gateway and the second adapter as a whole is described in the embodiment of FIG. 7, and details are not repeated herein.

The transmission propagation delay related information of the anchor gateway and the second adapter as a whole is described in the embodiment of FIG. 7, and details are not repeated herein.

The delay related information of the anchor gateway is described in the embodiment of FIG. 7, and details are not repeated herein.

Optionally, the transmitting second capability information and/or delay related information of an anchor gateway includes: transmitting the second capability information and/or the delay related information of the anchor gateway when a preset condition is met.

The preset condition may be at least one of the following:
  a request for the second capability information is received from a network;
  a request for the delay related information of the anchor gateway is received from the network;
  the type of the anchor gateway is a bridge; and the anchor gateway supports time-sensitive communication.

Optionally, after the step of transmitting the second capability information and/or the delay related information of the anchor gateway, the method further includes:

obtaining port configuration information, where the port configuration information includes at least one of the following: information related to a port, a bandwidth of the port, and a transmission rate of the port; and configuring the bandwidth and/or transmission rate of the port based on the port configuration information that is obtained.

Optionally, the transmitting second capability information and/or delay related information of the anchor gateway includes:

transmitting the second capability information and/or the delay related information of the anchor gateway to a target end, where the target end includes: an anchor gateway, a RAN network element, and a CN network element; when the first communications network element is the second adapter, the target end may be the anchor gateway; when the first communications network element is the anchor gateway, the target end may be a RAN network element and/or a CN network element; and the target end may be a communications network element that forms a bridge with the anchor gateway and/or the second adapter in the network.

The CN network element may include, but is not limited to, at least one of the following: a PCF, an AMF, an SMF, and an AF.

The communications device 1500 is capable of implementing the processes implemented by the third communications device in the method embodiments of this disclosure, with the same beneficial effects achieved. To avoid repetition, details are not described herein again.

Figure 16:
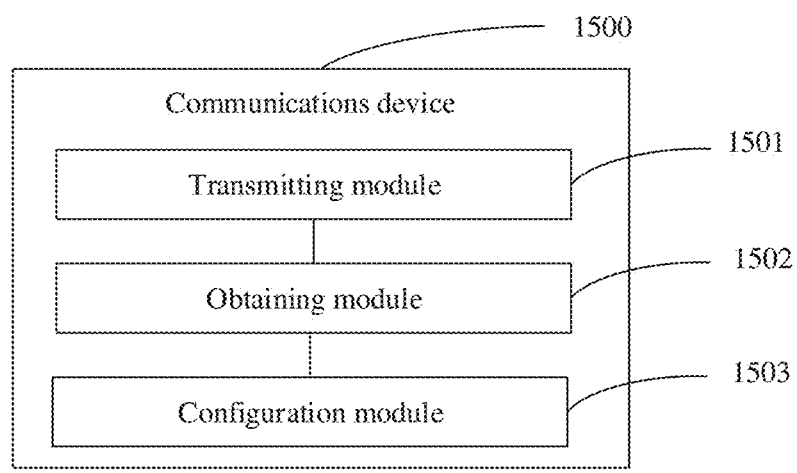
FIG. 16 is a structural diagram of another communications device according to this disclosure.

Optionally, as shown in FIG. 16, the communications device 1500 further includes:

an obtaining module 1502, configured to obtain port configuration information, where the port configuration information includes at least one of the following: information related to a port, a bandwidth of the port, and a transmission rate of the port; and a configuration module 1503, configured to configure the bandwidth and/or transmission rate of the port based on the port configuration information that is obtained.

The port configuration information may be transmitted by the network.

The port configuration information may be port configuration information of the second port. When the third communications device is the anchor gateway and the second port is the port of the second adapter, the anchor gateway transmits the port configuration information to the second adapter.

In this implementation, the bandwidth and/or transmission rate of the port is configured based on the port configuration information that is obtained, so that the configured port bandwidth is more suitable for transmission of time-sensitive data.

The communications device 1500 is capable of implementing the processes implemented by the first communications device in the method embodiments of this disclosure, with the same beneficial effects achieved. To avoid repetition, details are not described herein again.

Figure 17:
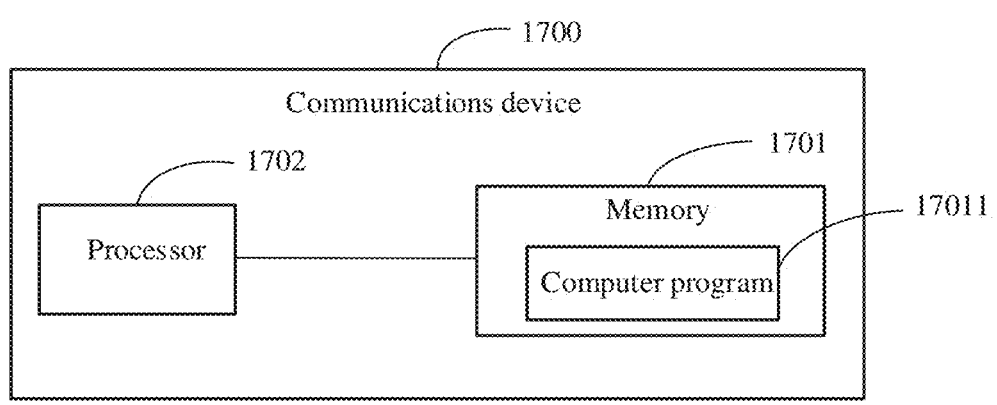
FIG. 17 is a structural diagram of another communications device according to this disclosure.

Referring to FIG. 17, FIG. 17 is a seventh structural diagram of a communications device according to an embodiment of this disclosure. As shown in FIG. 17, the communications device 1700 includes a memory 1701, a processor 1702, and a computer program 17011 stored on the memory 1701 and capable of running on the processor 1702.

When the communications device 1700 acts as the first communications device in the foregoing method embodiment, the following steps are implemented when the computer program 17011 is executed by the processor 1702:

transmitting first capability information and/or delay related information of UE.

Optionally, the first capability information may include at least one of the following:

information related to a delay between the UE and a first adapter;

bridge identification information of the first adapter;

information about a bandwidth supported by the first adapter;

transmission propagation delay related information of the first adapter;

bridge identification information of the UE and the first adapter as a whole;

information about a bandwidth supported by the UE and the first adapter as a whole; and transmission propagation delay related information of the UE and the first adapter as a whole.

The UE and the first adapter may be co-located as one device, or be connected through an interface (such as an N60 interface).

In an implementation, when the first communications device is the UE, the first communications device may transmit the first capability information to the network. In another implementation, when the first communications device is the first adapter, the first communications device may transmit the first capability information to the UE.

In an implementation, the first capability may be understood as a capability of a bridge formed by the UE and the first adapter as a whole. The first adapter may be a time-sensitive network adapter to which the UE is connected.

In an implementation, the UE obtains the first capability information from the first adapter.

(1.1) The information related to the bandwidth supported by the first adapter may be information related to an available bandwidth supported by the first adapter. The information about a bandwidth supported by the first adapter may be information about a bandwidth supported by a port of the first adapter. The port is a port connected to a bridge or an end station.

The information about a bandwidth supported by the UE and the first adapter as a whole is information related to an available bandwidth supported by the UE and the first adapter as a whole. The information about a bandwidth supported by the UE and the first adapter as a whole may be information about a bandwidth supported by a port of the UE and the first adapter as a whole. The port is a port connected to a bridge or an end station.

Optionally, the information about a bandwidth supported by a port includes at least one of the following: information related to the port, a bandwidth of the port, a bandwidth availability parameter of the port, or a transmission rate of the port.

In an implementation, the bandwidth availability parameter of the port may be defined in the IEEE 802.1Q series, for example, a bandwidth availability parameter (Bandwidth Availability Parameters).

In an implementation, the bandwidth of the port may be an available bandwidth of the port, and the transmission rate of the port may be an available transmission rate of the port.

(1.2) The transmission propagation delay related information of the first adapter may be transmission propagation delay related information of a port of the first adapter.

The transmission propagation delay related information of the UE and the first adapter as a whole may be transmission propagation delay related information of a port of the UE and the first adapter as a whole.

Optionally, the transmission propagation delay related information of a port includes at least one of the following: information related to the port, a transmission propagation delay of the port, or a traffic class (traffic class).

The transmission propagation delay of the port may be a time required for transmitting a data frame from the port of the first adapter or the port of the UE and the first adapter as a whole to a port of a connected station (a bridge or an end station).

(1.3) Optionally, the information related to a port may include at least one of the following: identification information of the port, information related to a direction of the port being an egress or an ingress, a port number, a MAC address of the port, an IP address of the port, VLAN tag information associated with the port, and data filter information of the port.

Optionally, the data filter information of the port or the data filter information may include at least one of the following: virtual local area network (VLAN) tag information, a media access control (MAC) address, an IPv4 address, a port number, an IPv6 address, and indication information of the port, where the indication information of the port includes indication information of a transmitting port or the indication information of a receiving port.

The VLAN tag information is also referred to as VLAN identification information (such as a VID). The VLAN tag information may include: a service VLAN tag (S-TAG) and/or a customer VLAN tag (C-TAG).

(1.4) Optionally, the traffic class is the number of transmission queues or a traffic type of the port. The traffic type may include at least one of the following: background (Background), best-effort (best effort), excellent effort (excellent effort), critical applications (critical application), video (video), voice (voice), internetwork control (Internetwork control), and network control (Network control).

(1.5) Optionally, the information related to a delay between the UE and the first adapter includes at least one of the following: information related to a first interface, information related to a second interface, the delay between the UE and the first adapter, or a traffic class associated with a data packet. The traffic class is described above, and details are not repeated herein.

Optionally, the first interface may be a first port, where the first port is a port connected to a bridge or an end station. The second interface may include one of the following: a UU interface of the UE, and a port connected to the UU interface of the UE. The UU interface is an interface between the UE and a RAN.

The first port may be a port of the first adapter or a port of the UE. The port of the first adapter may be a port, connected to a bridge or an end station, of the first adapter. The port of the UE may be a port, connected to a bridge or an end station, of the UE.

Further, the UU interface of the UE includes a tunnel at the UU interface of the UE.

Further, the tunnel may include at least one of the following: a tunnel related to a port, a tunnel related to a VLAN, and a tunnel related to data filter information.

In an implementation, the first interface is a data ingress, and the second interface is a data egress. In another implementation, the second interface is a data ingress, and the first interface is a data egress.

In a case that the first interface is the first port, the information related to the first interface may be port-related information of the first port (the port-related information is described above, and details are not repeated herein).

In a case that the second interface is a UU interface of the UE, the information related to the second interface may be information about a first tunnel of the UU interface.

Further, the first tunnel may include at least one of the following: a tunnel related to a port, a tunnel related to a VLAN, and a tunnel related to data filter information. The port may be the first port (which may be the port of the first adapter or the port of the UE). The data filter information may be data filter information of the first port. The VLAN may be a VLAN associated with the first port.

Information about the tunnel related to the port includes at least one of the following: the port-related information of the port, and identification information of a tunnel (such as a PDU session identifier and/or a QoS flow identifier).

Information about the tunnel related to the VLAN includes at least one of the following: VLAN tag information of the VLAN (the VLAN tag information is described above, and details are not repeated herein) and tunnel identification information (such as a PDU session identifier and/or a QoS flow identifier).

Information about the tunnel related to the data filter information includes at least one of the following: the data filter information (the data filter information is as described above, and details are not repeated herein) and tunnel identification information (such as a PDU session identifier and/or a QoS flow identifier).

When the tunnel is a QoS flow, the identification information of the tunnel may be a QoS flow identifier and/or a PDU session identifier to which the QoS flow belongs. When the tunnel is a PDU session, the identification information of the tunnel may be a PDU session identifier.

Optionally, the delay between the UE and the first adapter may be a bridge delay of the UE and the first adapter as a whole. In an implementation, the delay between the UE and the first adapter may be a time required for transmitting a data packet from a data ingress (such as the first interface or the second interface) to a data egress (such as the second interface or the first interface).

For example, in a case that the data ingress (such as the first interface or the second interface) is the UU interface of the UE, the data egress (such as the second interface or the first interface) may be the first port; or in a case that the data ingress is the first port, the data egress may be the UU interface of the UE.

(2.1) Further, the delay between the UE and the first adapter may be at least one of the following:
  a time required for transmitting a data packet from the first interface to the second interface; or
  a time required for transmitting a data packet from the second interface to the first interface.

In an implementation, the time required for transmitting a data packet from the first interface to the second interface is the same as the time required for transmitting a data packet from the second interface to the first interface. In another implementation, the time required for transmitting a data packet from the first interface to the second interface is different from the time required for transmitting a data packet from the second interface to the first interface.

Further, the time required for transmitting a data packet from the first interface to the second interface may be at least one of the following:
- a time required for transmitting a data packet from the first port to the UU interface of the UE; and
- a time required from receiving a data packet at the first port until preparing to transmit the data packet from the UU interface of the UE.

In an implementation, the time required for transmitting a data packet from the first port to the UU interface of the UE includes: the time required for transmitting the data packet from the first port to the first tunnel at the UU interface of the UE. The first tunnel is described above, and details are not repeated herein.

In an implementation, the time required from receiving a data packet at the first port until preparing to transmit the data packet from the UU interface of the UE includes: the time required from receiving the data packet at the first port until preparing to transmit the data packet from the UU interface of the UE to the first tunnel. The first tunnel is described above, and details are not repeated herein.

(2.2) Further, the time required for transmitting a data packet from the second interface to the first interface may be at least one of the following:
- a time required for transmitting a data packet from the UU interface of the UE to the first port; and
- a time required for receiving a data packet by the UE from the UU interface of the UE until transmitting the data packet to the first port.

In an implementation, the time required for receiving a data packet by the UE from the UU interface of the UE until transmitting the data packet to the first port includes at least one of the following: a time required for receiving a data packet by the UE from the first tunnel at the UU interface of the UE until transmitting the data packet to the first port, and a time required for parsing the data packet from a PDCP layer of the first tunnel at the UU interface until transmitting the data packet to the first port.

In an implementation, the first tunnel may include at least one of the following: a tunnel related to a port, a tunnel related to a VLAN, and a tunnel related to data filter information. The port may be the first port, such as a port connected to a bridge or an end station (which may be a port of the first adapter or a port of the UE). The data filter information may be data filter information of the first port. The VLAN may be a VLAN associated with the first port.

(2.3) Further, the delay between the UE and the first adapter may include at least one of the following: a maximum delay between the UE and the first adapter and a minimum delay between the UE and the first adapter. The minimum delay between the UE and the first adapter may also be referred to as a minimum bridge delay of the UE and the first adapter as a whole, and the maximum delay between the UE and the first adapter is also referred to as a maximum bridge delay of the UE and the first adapter as a whole. The minimum delay between the UE and the first adapter may be further divided into a minimum delay, related to a size of a data packet, between the UE and the first adapter, and a minimum delay, unrelated to a size of a data packet, between the UE and the first adapter. The maximum delay between the UE and the first adapter may be further divided into a maximum delay, related to a size of a data packet, between the UE and the first adapter, and a maximum delay, unrelated to a size of a data packet, between the UE and the first adapter.

(2.4) Further, the delay between the UE and the first adapter may include at least one of the following: a downlink delay and an uplink delay.

The downlink delay may include one of the following:
- a time required for transmitting a data packet from the UE to the first adapter;
- a time required for transmitting a data packet from the second interface to the first interface;
- a time required for transmitting a data packet from the UU interface of the UE to the first port; and
- a time required for transmitting a data packet from the first tunnel at the UU interface of the UE to the first port.

The downlink delay may be referred to as a delay from the UE to the first adapter.

The uplink delay may include at least one of the following:
- a time required for transmitting a data packet from the first interface to the second interface;
- a time required for transmitting a data packet from the first adapter to the UE;
- a time required for transmitting a data packet from the first port to the UU interface of the UE;
- a time required from receiving a data packet at the first port until preparing to transmit the data packet from the UU interface of the UE;
- a time required for transmitting a data packet from the first port to the first tunnel at the UU interface of the UE; or
- a time required from receiving a data packet at the first port until preparing to transmit the data packet from the first tunnel at the UU interface of the UE.

It is easy to understand that, for uplink data transmission, the UE needs to request the RAN for scheduling. A delay for waiting for scheduling by the RAN network element does not belong to the delay between the UE and the first adapter.

The uplink delay may be referred to as a delay from the first adapter to the UE.

In an implementation, the uplink delay and the downlink delay are the same. In another implementation, the uplink delay and the downlink delay are different.

(2.5) Optionally, the delay related information of the UE includes at least one of the following: information related to a first interface, information related to a second interface, the delay of the UE, and a traffic class associated with a data packet.

The information related to the first interface, the information related to the second interface, and the traffic class is described above, and details are not repeated herein.

The delay of the UE is a time required for transmitting a data packet from the data ingress (such as the first interface or the second interface) of the UE to the data egress (such as the second interface or the first interface) of the UE.

Further, the delay of the UE may be at least one of the following:
- a time required for transmitting a data packet from the first interface to the second interface; or
- a time required for transmitting a data packet from the second interface to the first interface.

In an implementation, the first interface is the first port, and the first port is a port of the UE. The port of the UE may be a port, connected to a bridge or an end station, of the UE.

In an implementation, the time required for transmitting a data packet from the first interface to the second interface may include at least one of the following: a time required for transmitting a data packet from the UU interface of the UE to the first port, and a time required for receiving a data packet by the UE from the UU interface until transmitting the data packet to the first port.

In another implementation, the time required for transmitting a data packet from the second interface to the first interface may include at least one of the following: a time required for transmitting a data packet from the first port to the UU interface of the UE, and a time required for receiving a data packet from the first port until transmitting the data packet from the UU interface of the UE.

Optionally, the transmitting first capability information and/or delay related information of UE includes:
when a preset condition is met, transmitting the first capability information and/or the delay related information of UE.

The preset condition may be at least one of the following:
a request for the first capability information is received from a network;
a request for the delay related information of the UE is received from the network;
the type of the UE is a bridge; and
the UE supports time-sensitive communication.

In this way, the first capability information and/or the delay related information of the UE can be transmitted only when the preset condition is met, so as to avoid frequent transmission of the first capability information and/or the delay related information of the UE, and reduce power consumption.

In an implementation, when the UE supports time-sensitive communication, the first capability information and/or the delay related information of the UE are transmitted.

Optionally, the transmitting first capability information and/or delay related information of UE includes:
transmitting the first capability information and/or the delay related information of the UE to a target end, where the target end includes: UE, a RAN network element, and a CN network element; when the first communications network element is the first adapter, the target end may be UE; when the first communications network element is UE, the target end may be a RAN network element and/or a CN network element; and the target end may be a communications network element that forms a bridge with the UE and/or the first adapter in the network.

The CN network element may include, but is not limited to, at least one of the following: a PCF, an AMF, an SMF, and an AF.

Optionally, after the step of transmitting the first capability information and/or the delay related information of the UE, the method further includes:
obtaining port configuration information, where the port configuration information includes at least one of the following: information related to a port, a bandwidth of the port, and a transmission rate of the port; and
configuring the bandwidth and/or transmission rate of the port based on the port configuration information that is obtained.

The port configuration information may be transmitted by the network.

The port configuration information may be port configuration information of the first port. When the first communications device is the UE and the first port is the port of the first adapter, the UE transmits the port configuration information to the first adapter.

In this implementation, the bandwidth and/or transmission rate of the port is configured based on the port configuration information that is obtained, so that the configured port bandwidth is more suitable for transmission of time-sensitive data.

When the communications device 1700 acts as the second communications device in the foregoing method embodiment, the following steps are implemented when the computer program 17011 is executed by the processor 1702:
obtaining first information, where the first information includes at least one of the following: first capability information, second capability information, delay related information of UE, and/or delay related information of an anchor gateway; and
performing a first operation based on the first information.

The first capability information is the first capability information in the embodiment shown in FIG. 4, and details are not repeated herein.

The delay related information of the UE is the first capability information in the embodiment shown in FIG. 4, and details are not repeated herein.

The delay related information of the anchor gateway is the second capability information in the embodiment shown in FIG. 7, and details are not repeated herein.

The second capability information is the second capability information in the embodiment shown in FIG. 7, and details are not repeated herein.

Optionally, the first capability information and/or the delay related information of the UE may be obtained from at least one of the following: the UE, a first communications device, and a RAN network element currently accessed by the UE.

Optionally, the second capability information and/or the delay related information of the anchor gateway may be obtained from at least one of the following: the UE, the anchor gateway, and a third communications device.

The anchor gateway is a gateway that terminates the N6 interface. Further, the anchor gateway may be an anchor gateway that establishes a tunnel related to a bridge or a tunnel related to a port.

The RAN network element is a RAN network element serving the UE.

Optionally, the first operation may be a time-sensitive related operation. For example, the first operation may include at least one of the following:
(1) determining a bridge capability of a bridge formed by the UE, a time-sensitive network adapter, and/or a network;
(2) determining second transmission configuration information for the time-sensitive data stream (such as user and/or network configuration information for the egress);
(3) transmitting configuration information of the time-sensitive data stream, where the configuration information for a time-sensitive data stream is the first transmission configuration information for the time-sensitive data stream or second transmission configuration information for the time-sensitive data stream;
(4) determining bridge configuration information; or
(5) disclosing or transmitting the bridge capability of the bridge formed by the UE, the time-sensitive network adapter, and/or the network.

The determining the bridge capability of the bridge formed by the UE, the time-sensitive network adapter, and/or the network includes at least one of the following:
determining an internal delay of a bridge formed by the UE and the network;
determining a bandwidth availability parameter of the bridge formed by the UE and the network;

determining an internal delay of the bridge formed by the UE, the time-sensitive network adapter, and the network;

determining a bandwidth availability parameter of the bridge formed by the UE, the time-sensitive network adapter, and the network; and determining a delay between a first interface and a fourth interface.

The first interface may be a first port. The first port is a port, connected to a bridge or an end station, of the UE or a first adapter.

The fourth interface may be a second port. The second port is a port, connected to a bridge or an end station, of the anchor gateway or a second adapter.

In an implementation, the internal delay of the bridge formed by the UE and the network may be determined as a sum of the following: a delay of the UE, a delay between the UE and the RAN network element, a delay between the RAN network element and the anchor gateway, and a delay of the anchor gateway (that is, the sum of the delay of the UE+the delay between the UE and the RAN network element+the delay between the RAN network element and the anchor gateway+the delay of the anchor gateway).

In an implementation, the internal delay of the bridge formed by the UE, the time-sensitive network adapter, and the network may be determined as a sum of the following: a delay between the UE and the first adapter, a transmission delay between the UE and the RAN network element, a processing delay of the RAN network element, a delay between the RAN network element and the anchor gateway, and a delay between the anchor gateway and the second adapter (that is, the sum of the delay between the UE and the first adapter+the transmission delay between the UE and the RAN network element+the processing delay of the RAN network element+the delay between RAN network element and the anchor gateway+the delay between the anchor gateway and the second adapter).

In an implementation, the internal delay of the bridge is the delay between the first interface and the fourth interface. The first capability information includes information related to the first interface and information related to the second interface. The second capability information includes information related to a third interface and information related to the fourth interface.

The information related to the second interface may be the information about the first tunnel of the UU interface. The information related to the third interface may be the information about the first tunnel of the N3N9 interface. The first interface and the fourth interface are associated by information about the first tunnel. The first tunnel is as described in the embodiment of FIG. 4 and/or FIG. 7.

In an implementation, the delay between the first interface and the fourth interface may be a sum of the following: a time required for transmitting a data packet from the first interface to the second interface, a delay between the UE and the RAN network element, a delay between the RAN network element and the anchor gateway, and a time required for transmitting a data packet from the third interface to the fourth interface (that is, the sum of the time required for transmitting a data packet from the first interface to the second interface+the delay between the UE and the RAN network element+the delay between the RAN network element and the anchor gateway+the time required for transmitting a data packet from the third interface to the fourth interface).

In another implementation, the delay between the first interface and the fourth interface may be a sum of the following: a time required for transmitting a data packet from the second interface to the first interface, a delay between the UE and the RAN network element, a delay between the RAN network element and the anchor gateway, and a time required for transmitting a data packet from the fourth interface to the third interface (that is, the sum of the time required for transmitting a data packet from the second interface to the first interface+the delay between the UE and the RAN network element+the delay between the RAN network element and the anchor gateway+the time required for transmitting a data packet from the fourth interface to the third interface).

The transmission configuration information of the time-sensitive data stream is determined based on the first information.

The transmitting the configuration information for a time-sensitive data stream based on the first information may include at least one of the following:

when a first condition is met, transmitting the configuration information for a time-sensitive data stream to the UE and/or the first adapter; and when a second condition is met, transmitting the configuration information for a time-sensitive data stream to the anchor gateway and/or the second adapter.

Optionally, the first condition includes at least one of the following:

the time-sensitive data stream is downlink data (for example, when the UE is an egress of the bridge formed by the UE and the network);

the type of the UE is a bridge;

an architecture type of time-sensitive networking is fully distributed;

the UE is an end station and the architecture type of time-sensitive networking is centralized-distributed hybrid; and indication information for the configuration information for a time-sensitive data stream indicates that the configuration information for a time-sensitive data stream is required.

Optionally, the second condition includes at least one of the following:

the time-sensitive data stream is uplink data (for example, the port of the bridge formed by the anchor gateway and the network is the egress); and the architecture type of time-sensitive networking is fully distributed or centralized-distributed hybrid.

Optionally, after the step of performing the first operation, the method further includes:

transmitting the determined bridge configuration information to at least one of the following:

the UE, the anchor gateway, the first adapter, and the second adapter.

In an implementation, the bridge configuration information is transmitted to the first adapter through the UE; in another implementation, the bridge configuration information is transmitted to the second adapter through the anchor gateway.

The bridge configuration information is configuration information of the bridge egress.

Optionally, the bridge configuration information includes at least one of the following: information related to a port and a configured bandwidth of the port.

In an implementation, when the time-sensitive data stream is downlink data or when the UE is a bridge egress or the first adapter is a bridge egress, the bridge configuration information is transmitted to the UE. When the first adapter is a bridge egress, the UE may forward the bridge configuration information to the first adapter.

In another implementation, when the time-sensitive data stream is uplink data or when the anchor gateway is a bridge egress or the second adapter is a bridge egress, the bridge configuration information is transmitted to the anchor gateway and/or the second adapter. When the second adapter is a bridge egress, the anchor gateway may forward the bridge configuration information to the second adapter.

When the communications device 1700 acts as the second communications device in the foregoing method embodiment, the following steps are implemented when the computer program 17011 is executed by the processor 1702:

obtaining bridge configuration information and/or configuration information for a time-sensitive data stream; and
 performing a second operation of time-sensitive communication based on the bridge configuration information and/or the configuration information for a time-sensitive data stream.

The bridge configuration information may be configuration information of a network egress.

Optionally, the bridge configuration information includes at least one of the following: information related to a port, a bandwidth of the port, and a transmission rate of the port.

The bandwidth of the port may be an available bandwidth of the port, and the transmission rate of the port may be an available transmission rate of the port.

The information related to a port is described in the embodiment of FIG. 4, and details are not repeated herein.

In an implementation, the performing the second operation related to time-sensitive communication based on the bridge configuration information and/or the configuration information for a time-sensitive data stream includes: configuring the bandwidth and/or transmission rate of the port based on obtained port configuration information.

In this embodiment of this disclosure, the bridge egress is configured to support time-sensitive communication.

When the communications device 1700 acts as the second communications device in the foregoing method embodiment, the following steps are implemented when the computer program 17011 is executed by the processor 1702:

transmitting second capability information and/or delay related information of the anchor gateway.

Optionally, the second capability information may include at least one of the following:

information related to a delay between an anchor gateway and a second adapter;
 bridge identification information of the second adapter;
 information about a bandwidth supported by the second adapter;
 transmission propagation delay related information of the second adapter;
 bridge identification information of the anchor gateway and the second adapter as a whole;
 information about a bandwidth supported by the anchor gateway and the second adapter as a whole; or
 transmission propagation delay related information of the anchor gateway and the second adapter as a whole.

The anchor gateway and the second adapter may be co-located as one device, or be connected through an interface.

In an implementation, when the time-sensitive network adapter is the anchor gateway, the time-sensitive network adapter may transmit the second capability information to the network. In another implementation, when the time-sensitive network adapter is the second adapter, the time-sensitive network adapter may transmit the second capability information to the anchor gateway.

The anchor gateway is a gateway (such as a UPF) that terminates the N6 interface.

In an implementation, the second capability may be understood as a capability of a bridge formed by the anchor gateway and the second adapter as a whole. The second adapter may be a time-sensitive network adapter to which the anchor gateway is connected.

In an implementation, the anchor gateway obtains the second capability information from the second adapter.

(1.1) The information related to the bandwidth supported by the second adapter may be information related to an available bandwidth supported by the second adapter. The information about a bandwidth supported by the second adapter may be information about a bandwidth supported by a port of the second adapter. The port is a port connected to a bridge or an end station.

The information about a bandwidth supported by the anchor gateway and the second adapter as a whole may be information related to an available bandwidth supported by the anchor gateway and the second adapter as a whole. The information about a bandwidth supported by the anchor gateway and the second adapter as a whole may be information about a bandwidth supported by a port of the anchor gateway and the second adapter as a whole. The port is a port connected to a bridge or an end station.

Optionally, the information about a bandwidth supported by a port includes at least one of the following: information related to the port, a bandwidth of the port, a bandwidth availability parameter of the port, or a transmission rate of the port.

In an implementation, the bandwidth availability parameter of the port may be defined in the IEEE 802.1Q series, for example, a bandwidth availability parameter (Bandwidth Availability Parameters).

In an implementation, the bandwidth of the port may be an available bandwidth of the port, and the transmission rate of the port may be an available transmission rate of the port.

(1.2) The transmission propagation delay related information of the second adapter may be transmission propagation delay related information of a port of the second adapter.

The transmission propagation delay related information of the anchor gateway and the second adapter as a whole is transmission propagation delay related information of a port of the anchor gateway and the second adapter as a whole.

Optionally, the transmission propagation delay related information of a port includes at least one of the following: information related to the port, a transmission propagation delay of the port, or a traffic class (traffic class).

The transmission propagation delay of the port may be a time required for transmitting a data frame from the port of the second adapter or the port of the anchor gateway and the second adapter as a whole to a port of a connected station (a bridge or an end station).

(1.3) Optionally, the information related to a port may include at least one of the following: identification information of the port, information related to a direction of the port being an egress or an ingress, a port number, a MAC address of the port, an IP address of the port, VLAN tag information associated with the port, and data filter information of the port.

Optionally, the data filter information of the port or the data filter information may include at least one of the following: virtual local area network (VLAN) tag information, a media access control (MAC) address, an IPv4 address, a port number, an IPv6 address, and indication information of the port, where the indication information of the port includes indication information of a transmitting port or the indication information of a receiving port.

The VLAN tag information is also referred to as VLAN identification information (such as a VID). The VLAN tag information may include: a service VLAN tag (S-TAG) and/or a customer VLAN tag (C-TAG).

(1.4) Optionally, the traffic class is the number of transmission queues or a traffic type of the port. The traffic type may include at least one of the following: background (Background), best-effort (best effort), excellent effort (excellent effort), critical applications (critical application), video (video), voice (voice), internetwork control (Internetwork control), and network control (Network control).

(1.5) Optionally, the information related to a delay between the anchor gateway and the second adapter includes at least one of the following: information related to a fourth interface, information related to a third interface, the delay between the anchor gateway and the second adapter, and a traffic class associated with a data packet. The traffic class is described above, and details are not repeated herein.

Optionally, the fourth interface may be a second port, where the second port is a port connected to a bridge or an end station. The third interface may include one of the following: an N3N9 interface of the anchor gateway, a port connected to the N3N9 interface of the anchor gateway, an N6 interface, and a port connected to the N6 interface. The N3N9 interface is an N3 or N9 interface. The N3 interface is an interface between a gateway and a RAN. The N9 interface is an interface between gateways. The N6 interface is an interface between the anchor gateway and an external network.

The second port may be a port of the second adapter or a port of the anchor gateway. The port of the second adapter may be a port, connected to a bridge or an end station, of the second adapter. The port of the anchor gateway may be a port, connected to a bridge or an end station, of the anchor gateway.

Further, the N3N9 interface of the anchor gateway includes a tunnel at the N3N9 interface of the anchor gateway.

Further, the tunnel may include at least one of the following: a tunnel related to a port, a tunnel related to a VLAN, and a tunnel related to data filter information.

In an implementation, the fourth interface is a data ingress, and the third interface is a data egress. In another implementation, the third interface is a data ingress, and the fourth interface is a data egress.

When the fourth interface is the second port, the information related to the fourth interface may be port-related information of the second port (the port-related information is described above, and details are not repeated herein).

In a case that the third interface is an N3N9 interface of the anchor gateway, the information related to the third interface may be information about a first tunnel of the N3N9 interface.

Further, the first tunnel may include at least one of the following: a tunnel related to a port, a tunnel related to a VLAN, and a tunnel related to data filter information. The port may be the second port (which may be a port of the second adapter or a port of the anchor gateway). The data filter information may be data filter information of the second port. The VLAN may be a VLAN associated with the second port.

Information about the tunnel related to the port includes at least one of the following: the port-related information of the port, and identification information of a tunnel (such as a PDU session identifier and/or a QoS flow identifier).

Information about the tunnel related to the VLAN includes at least one of the following: VLAN tag information of the VLAN (the VLAN tag information is described above, and details are not repeated herein) and tunnel identification information (such as a PDU session identifier and/or a QoS flow identifier).

Information about the tunnel related to the data filter information includes at least one of the following: the data filter information (the data filter information is as described above, and details are not repeated herein) and tunnel identification information (such as a PDU session identifier and/or a QoS flow identifier).

When the tunnel is a QoS flow, the identification information of the tunnel may be a QoS flow identifier and/or a PDU session identifier to which the QoS flow belongs. When the tunnel is a PDU session, the identification information of the tunnel may be a PDU session identifier.

Optionally, the delay between the anchor gateway and the second adapter may also be referred to as a bridge delay of the anchor gateway and the second adapter as a whole. In an implementation, the delay between the anchor gateway and the second adapter may be a time required for transmitting a data packet from a data ingress (such as the fourth interface or the third interface) to a data egress (such as the third interface or the fourth interface).

For example: when the data ingress (such as the fourth interface or the third interface) is the N3N9 interface of the anchor gateway, the data egress (such as the third interface or the fourth interface) may be the second port; or when the data ingress is the second port, the data egress may be the N3N9 interface of the anchor gateway.

(2.1) Further, the delay between the anchor gateway and the second adapter may be at least one of the following:
  a time required for transmitting a data packet from the fourth interface to the third interface; and
  a time required for transmitting a data packet from the third interface to the fourth interface.

In an implementation, the time required for transmitting a data packet from the fourth interface to the third interface is the same as the time required for transmitting a data packet from the third interface to the fourth interface. In another implementation, the time required for transmitting a data packet from the fourth interface to the third interface is different from the time required for transmitting a data packet from the third interface to the fourth interface.

Further, the time required for transmitting a data packet from the fourth interface to the third interface may be at least one of the following:
  a time required for transmitting a data packet from the second port to the N3N9 interface of the anchor gateway;
  a time required from receiving a data packet at the second port until preparing to transmit the data packet from the N3N9 interface of the anchor gateway.

In an implementation, the time required for transmitting a data packet from the second port to the N3N9 interface of the anchor gateway includes: the time required for transmitting the data packet from the port of the second adapter to a first tunnel at the N3N9 interface of the anchor gateway. The first tunnel is described above, and details are not repeated herein.

In an implementation, the time required from receiving a data packet at the second port until preparing to transmit the data packet from the N3N9 interface of the anchor gateway includes: the time required from receiving the data packet at the second port until preparing to transmit the data packet from the N3N9 interface of the anchor gateway to the first tunnel. The first tunnel is described above, and details are not repeated herein.

(2.2) Further, the time required for transmitting a data packet from the third interface to the fourth interface may be at least one of the following:
   a time required for transmitting a data packet from the N3N9 interface of the anchor gateway to the second port; and
   a time required for transmitting a data packet from the N3N9 interface by the anchor gateway until transmitting the data packet to the second port.

In an implementation, the time required for transmitting a data packet from the N3N9 interface by the anchor gateway until transmitting the data packet to the second port includes at least one of the following: a time required for transmitting the data packet from a first tunnel of the N3N9 interface by the anchor gateway until transmitting the data packet to the second port; and a time required for parsing the data packet from a GTP-U layer of the first tunnel at the N3N9 interface by the anchor gateway until transmitting the data packet to the second port.

In an implementation, the first tunnel may include at least one of the following: a tunnel related to a port, a tunnel related to a VLAN, and a tunnel related to data filter information. The port may be the second port, such as a port connected to a bridge or an end station (which may be a port of the second adapter or a port of the anchor gateway). The data filter information may be data filter information of the second port. The VLAN may be a VLAN associated with the second port.

(2.3) Further, the delay between the anchor gateway and the second adapter may include at least one of the following: a maximum delay between the anchor gateway and the second adapter and a minimum delay between the anchor gateway and the second adapter. The minimum delay between the anchor gateway and the second adapter may also be referred to as a minimum bridge delay of the anchor gateway and the second adapter as a whole, and the maximum delay between the anchor gateway and the second adapter is also referred to as a maximum bridge delay of the anchor gateway and the second adapter as a whole. The minimum delay between the anchor gateway and the second adapter may be further divided into a minimum delay, related to a size of a data packet, between the anchor gateway and the second adapter, and a minimum delay, unrelated to a size of a data packet, between the anchor gateway and the second adapter. The maximum delay between the anchor gateway and the second adapter may be further divided into a maximum delay, related to a size of a data packet, between the anchor gateway and the second adapter, and a maximum delay, unrelated to a size of a data packet, between the anchor gateway and the second adapter.

(2.4) Further, the delay between the anchor gateway and the second adapter may include at least one of the following: a downlink delay and an uplink delay.

The downlink delay may include one of the following:
   a time required for transmitting a data packet from the anchor gateway to the second adapter;
   a time required for transmitting a data packet from the third interface to the fourth interface;
   a time required for transmitting a data packet from the N3N9 interface of the anchor gateway to the second port; and
   a time required for transmitting a data packet from the first tunnel at the N3N9 interface of the anchor gateway to the second port.

The downlink delay may be referred to as a delay from the anchor gateway to the second adapter.

The uplink delay may include at least one of the following:
   a time required for transmitting a data packet from the fourth interface to the third interface;
   a time required for transmitting a data packet from the second adapter to the anchor gateway;
   a time required for transmitting a data packet from the second port to the N3N9 interface of the anchor gateway;
   a time required from receiving a data packet at the second port until preparing to transmit the data packet from the N3N9 interface of the anchor gateway;
   a time required for transmitting a data packet from the second port to the first tunnel at the N3N9 interface of the anchor gateway; and
   a time required from receiving a data packet at the second port until preparing to transmit the data packet from the first tunnel at the N3N9 interface of the anchor gateway.

It is easy to understand that uplink data transmission requires the anchor gateway to request the RAN for scheduling. A delay for waiting for scheduling by the RAN network element does not belong to the delay between the anchor gateway and the second adapter.

The uplink delay may be referred to as a delay from the second adapter to the anchor gateway.

In an implementation, the uplink delay and the downlink delay are the same. In another implementation, the uplink delay and the downlink delay are different.

(2.5) Optionally, the delay related information of the anchor gateway includes at least one of the following: information related to the fourth interface, information related to the third interface, the delay of the anchor gateway, and a traffic class associated with a data packet.

The information related to the fourth interface, the information related to the third interface, and the traffic class is described above, and details are not repeated herein.

The delay of the anchor gateway is a time required for transmitting a data packet from the data ingress of the anchor gateway (such as the fourth interface or the third interface) to the data egress of the anchor gateway (such as the third interface or the fourth interface).

Further, the delay of the anchor gateway may be at least one of the following:
   a time required for transmitting a data packet from the fourth interface to the third interface; and
   a time required for transmitting a data packet from the third interface to the fourth interface.

In an implementation, the fourth interface is the second port, and the second port is a port of the anchor gateway. The port of the anchor gateway may be a port, connected to a bridge or an end station, of the anchor gateway.

In an implementation, the time required for transmitting a data packet from the fourth interface to the third interface may include at least one of the following: a time required for transmitting a data packet from the N3N9 interface of the anchor gateway to the second port, and a time required for receiving a data packet by the anchor gateway from the N3N9 interface until transmitting the data packet to the second port.

In another implementation, the time required for transmitting a data packet from the third interface to the fourth interface may include at least one of the following: a time required for transmitting a data packet from the second port to the N3N9 interface of the anchor gateway, and a time required for receiving a data packet from the second port until transmitting the data packet to the N3N9 interface of the anchor gateway.

Optionally, the transmitting second capability information and/or delay related information of an anchor gateway includes: transmitting the second capability information and/or the delay related information of the anchor gateway when a preset condition is met.

The preset condition may be at least one of the following:
a request for the second capability information is received from a network;
a request for the delay related information of the anchor gateway is received from the network;
the type of the anchor gateway is a bridge; and
the anchor gateway supports time-sensitive communication.

In this way, the second capability information and/or delay related information of the anchor gateway can be transmitted only when the preset condition is met, so as to avoid frequent transmission of the second capability information and/or the delay related information of the anchor gateway, and reduce power consumption.

In an implementation, when the anchor gateway supports time-sensitive communication, the second capability information and/or the delay related information of the anchor gateway are transmitted.

Optionally, the transmitting second capability information and/or delay related information of the anchor gateway includes:
transmitting the second capability information and/or the delay related information of the anchor gateway to a target end, where the target end includes: an anchor gateway, a RAN network element, and a CN network element; when the first communications network element is the second adapter, the target end may be the anchor gateway; when the first communications network element is the anchor gateway, the target end may be a RAN network element and/or a CN network element; and the target end may be a communications network element that forms a bridge with the anchor gateway and/or the second adapter in the network.

The CN network element may include, but is not limited to, at least one of the following: a PCF, an AMF, an SMF, and an AF.

Optionally, after the step of transmitting the second capability information and/or the delay related information of the anchor gateway, the method further includes:
obtaining port configuration information, where the port configuration information includes at least one of the following: information related to a port, a bandwidth of the port, and a transmission rate of the port; and
configuring the bandwidth and/or transmission rate of the port based on the port configuration information that is obtained.

The port configuration information may be transmitted by the network.

The port configuration information may be port configuration information of the second port. When the third communications device is the anchor gateway and the second port is the port of the second adapter, the anchor gateway transmits the port configuration information to the second adapter.

In this implementation, the bandwidth and/or transmission rate of the port is configured based on the port configuration information that is obtained, so that the configured port bandwidth is more suitable for transmission of time-sensitive data.

The communications device 1700 is capable of implementing each process implemented by the communications device in the foregoing method embodiments. To avoid repetition, details are not described herein again.

An embodiment of this disclosure further provides a computer-readable storage medium. The computer-readable storage medium stores a computer program, and when the computer program is executed by a processor, the processes of the embodiment of the method for supporting time-sensitive communication are implemented, with the same technical effect achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the related art, may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The foregoing storage medium may be a magnetic disk, an optical disc, a read-only memory (ROM), a random access memory (RAM), or the like.

It may be understood that the embodiments described in this disclosure may be implemented by hardware, software, firmware, middleware, microcode, or a combination thereof. For hardware implementation, a module, a unit, a sub-unit, a sub-module, and the like may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

The invention claimed is:

1. A method for supporting time-sensitive communication, performed by a first communications device, wherein the first communications device is an anchor gateway or a first adapter, the first adapter is a network-side time sensing network (TSN) translator, the anchor gateway is a gateway that terminates a N6 interface, and the method comprises:
   transmitting first capability information, or transmitting first capability information and delay related information of an anchor gateway; wherein
   the first capability information comprises at least one of the following:
   information related to a delay between an anchor gateway and a first adapter;
   transmission propagation delay related information of the first adapter; or
   transmission propagation delay related information of the anchor gateway co-located with the first adapter as one device;
   wherein the transmission propagation delay related information of the first adapter comprises a time required for transmitting from a port of the first adapter to a port of a connected station;
   the transmission propagation delay related information of the anchor gateway co-located with the first adapter as one device comprises a time required for transmitting from a port of the anchor gateway co-located with the first adapter as one device to a port of a connected station;
   the transmitting the first capability information comprises:
   transmitting the first capability information to a target end, wherein the target end comprises the anchor gateway, a radio access network (RAN) element or a core network (CN) element;
   wherein the information related to a delay between the anchor gateway and the first adapter comprises at least one of the following:
   information related to a first interface, information related to a second interface, the delay between the anchor gateway and the first adapter, or a traffic class associated with a data packet;
   wherein the delay between the anchor gateway and the first adapter comprises at least one of the following:
   a time required for transmitting a data packet from the first interface to the second interface; or
   a time required for transmitting a data packet from the second interface to the first interface;
   wherein the first interface is a second port, the information related to the first interface is port-related information of the second port, wherein the second port is a port connected to a bridge or an end station;
   wherein the second interface is an N3 or N9 interface of the anchor gateway, the information related to the second interface is information about a first tunnel of the N3 or N9 interface.

2. The method according to claim 1, wherein the first capability information further comprises at least one of the following:
   bridge identification information of the first adapter;

bridge identification information of the anchor gateway and the first adapter as a whole;
the information about a bandwidth supported by the first adapter; or
the information about a bandwidth supported by the anchor gateway and the first adapter as a whole;
wherein the information about the bandwidth supported by the first adapter is information about a bandwidth supported by a port of the first adapter; and
the information about a bandwidth supported by the anchor gateway and the first adapter as a whole is information about a bandwidth supported by a port of the anchor gateway and the first adapter as a whole.

3. The method according to claim 2, wherein the information about a bandwidth supported by a port comprises at least one of the following:
information related to the port, a bandwidth of the port, a bandwidth availability parameter of the port, or a transmission rate of the port;
wherein the information related to a port comprises at least one of the following:
identification information of the port, information related to a direction of the port being an egress or an ingress, a port number, a media access control MAC address of the port, an internet protocol IP address of the port, virtual local area network VLAN tag information associated with the port, or data filter information of the port.

4. The method according to claim 1, wherein the connected station comprises a bridge or an end station.

5. A method for supporting time-sensitive communication, performed by a second communications device, wherein the second communications device is a core network (CN) element, and the method comprises:
obtaining first information, wherein the first information comprises at least one of: first capability information or second capability information; or
the first information comprises at least one of:
the second capability information and delay related information of UE; or
the first capability information and delay related information of an anchor gateway, wherein the anchor gateway is a gateway that terminates a N6 interface;
wherein
the first capability information comprises at least one of the following: information related to a delay between an anchor gateway and a first adapter, transmission propagation delay related information of the first adapter, or transmission propagation delay related information of the anchor gateway co-located with the first adapter as one device;
the second capability information comprises at least one of the following: information related to a delay between the UE and a second adapter, transmission propagation delay related information of the second adapter, or transmission propagation delay related information of the UE co-located with the second adapter as one device; wherein the transmission propagation delay related information of the second adapter comprises a time required for transmitting from a port of the second adapter to a port of a connected station, and the transmission propagation delay related information of the UE co-located with the second adapter as one device comprises a time required for transmitting from a port of the UE co-located with the second adapter as one device to a port of a connected station;
wherein the transmission propagation delay related information of the first adapter comprises a time required for transmitting from a port of the first adapter to a port of a connected station;
the transmission propagation delay related information of the anchor gateway co-located with the first adapter as one device comprises a time required for transmitting from a port of the anchor gateway co-located with the first adapter as one device to a port of a connected station;
the second capability information is obtained by the second communications device from at least one of the UE, the second adapter, or a radio access network (RAN) network element currently accessed by the UE;
the first capability information is obtained by the second communications device from at least one of the UE, the anchor gateway, or the first adapter.

6. The method according to claim 5, the method further comprises: performing a first operation based on the first information;
wherein the first operation comprises at least one of the following:
determining a bridge capability of a bridge formed by at least one of the UE, a time-sensitive network adapter, or a network;
determining second transmission configuration information for a time-sensitive data stream;
transmitting configuration information of the time-sensitive data stream, wherein the configuration information for a time-sensitive data stream is first transmission configuration information for the time-sensitive data stream or second transmission configuration information for the time-sensitive data stream;
determining bridge configuration information; or
disclosing or transmitting the bridge capability of the bridge formed by at least one of the UE, the time-sensitive network adapter, or the network.

7. The method according to claim 6, wherein the bridge capability of a bridge formed by at least one of the UE, a time-sensitive network adapter, or a network comprises:
an internal delay of a bridge formed by the UE and the network; or
an internal delay of a bridge formed by the UE, the time-sensitive network adapter and the network.

8. The communications device according to claim 7, wherein the processor executes the computer program to perform:
performing a first operation based on the first information;
the first operation comprises at least one of the following:
determining a bridge capability of a bridge formed by at least one of the UE, a time-sensitive network adapter, or a network;
determining second transmission configuration information for a time-sensitive data stream;
transmitting configuration information of the time-sensitive data stream, wherein the configuration information for a time-sensitive data stream is first transmission configuration information for the time-sensitive data stream or second transmission configuration information for the time-sensitive data stream;
determining bridge configuration information; or
disclosing or transmitting the bridge capability of the bridge formed by at least one of the UE, the time-sensitive network adapter, or the network.

9. The communications device according to claim 8, wherein the determining a bridge capability of a bridge formed by at least one of the UE, a time-sensitive network adapter, or a network comprises at least one of the following:
  determining an internal delay of a bridge formed by the UE and the network;
  determining a bandwidth availability parameter of the bridge formed by the UE and the network; or
  determining an internal delay of the bridge formed by the UE, the time-sensitive network adapter, and the network.

10. The method for supporting time-sensitive communication according to claim 6, wherein the determining a bridge capability of a bridge formed by at least one of the UE, a time-sensitive network adapter, or a network comprises at least one of the following:
  determining an internal delay of a bridge formed by the UE and the network;
  determining a bandwidth availability parameter of the bridge formed by the UE and the network; or
  determining an internal delay of the bridge formed by the UE, the time-sensitive network adapter, and the network.

11. The method according to claim 5, wherein the connected station comprises a bridge or an end station.

12. The method for supporting time-sensitive communication according to claim 5, wherein the first adapter is a network-side time sensing network (TSN) translator, and the second adapter is a UE-side TSN translator.

13. A communications device, wherein the communication device is second communications device, wherein the second communications device is a core network (CN) element, and the communications device comprises a processor, a memory, and a computer program stored in the memory and capable of running on the processor, wherein the processor executes the computer program to perform:
  obtaining first information, wherein the first information comprises at least one of: first capability information or second capability information; or
  the first information comprises at least one of:
  the second capability information and delay related information of UE; or
  the first capability information and delay related information of an anchor gateway, wherein the anchor gateway is a gateway that terminates a N6 interface;
  wherein
  the first capability information comprises at least one of the following: information related to a delay between an anchor gateway and a first adapter, transmission propagation delay related information of the first adapter, or transmission propagation delay related information of the anchor gateway co-located with the first adapter as one device;
  the second capability information comprises at least one of the following: information related to a delay between the UE and a second adapter, transmission propagation delay related information of the second adapter, transmission propagation delay related information of the UE co-located with the second adapter as one device; wherein the transmission propagation delay related information of the second adapter comprises a time required for transmitting from a port of the second adapter to a port of a connected station, and the transmission propagation delay related information of the UE co-located with the second adapter as one device comprises a time required for transmitting from a port of the UE co-located with the second adapter as one device to a port of a connected station;
  wherein the transmission propagation delay related information of the first adapter comprises a time required for transmitting from a port of the first adapter to a port of a connected station;
  the transmission propagation delay related information of the anchor gateway co-located with the first adapter as one device comprises a time required for transmitting from a port of the anchor gateway co-located with the first adapter as one device to a port of a connected station;
  the second capability information is obtained by the second communications device from at least one of the UE, the second adapter, or a radio access network (RAN) network element currently accessed by the UE;
  the first capability information is obtained by the second communications device from at least one of the UE, the anchor gateway, or the first adapter.

14. The communications device according to claim 13, wherein the bridge capability of a bridge formed by at least one of the UE, a time-sensitive network adapter, or a network comprises:
  an internal delay of a bridge formed by the UE and the network; or
  an internal delay of a bridge formed by the UE, the time-sensitive network adapter and the network.

15. The communications device according to claim 13, wherein the connected station comprises a bridge or an end station.

16. The communications device according to claim 13, wherein the first adapter is a network-side time sensing network (TSN) translator, and the second adapter is a UE-side TSN translator.

* * * * *